United States Patent [19]
Sung et al.

[11] Patent Number: 6,087,298
[45] Date of Patent: *Jul. 11, 2000

[54] EXHAUST GAS TREATMENT SYSTEM

[75] Inventors: Shiang Sung, New York, N.Y.; Harold N. Rabinowitz, Upper Montclair; Rudolf M. Smaling, Plainfiled, both of N.J.

[73] Assignee: Engelhard Corporation, Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/645,985

[22] Filed: May 14, 1996

[51] Int. Cl.$^7$ ...................................................... B01J 23/44
[52] U.S. Cl. ........................... 502/333; 502/325; 502/326; 502/327; 502/328; 502/329; 502/330; 502/303; 502/304; 502/334; 502/335; 502/336; 502/339
[58] Field of Search ..................... 502/325, 326, 502/327, 328, 329, 330, 303, 304, 333, 334, 335, 336, 339

[56] References Cited

U.S. PATENT DOCUMENTS

| | | | |
|---|---|---|---|
| 3,524,721 | 8/1970 | Stephens | 23/2 |
| 3,545,917 | 12/1970 | Stephens | 23/2 |
| 3,552,913 | 1/1971 | Stephens | 23/2 |
| 3,676,370 | 7/1972 | Stephens | 252/455 |
| 3,787,560 | 1/1974 | Stephens | 423/239 |
| 3,899,444 | 8/1975 | Stephens | 252/455 |
| 3,956,188 | 5/1976 | Hindin et al. | 252/465 |
| 3,993,572 | 11/1976 | Hindin et al. | 252/462 |
| 4,021,185 | 5/1977 | Hindin et al. | 431/7 |

(List continued on next page.)

FOREIGN PATENT DOCUMENTS

| | | | |
|---|---|---|---|
| 615721 | 8/1989 | Australia . | |
| 0 335 847 A1 | 10/1989 | European Pat. Off. | B01D 23/56 |
| 0 393 612 A2 | 10/1990 | European Pat. Off. | B01J 23/56 |
| 0 428 752 A1 | 5/1991 | European Pat. Off. | B01J 23/56 |
| 0 443 765 A1 | 8/1991 | European Pat. Off. | B01J 37/02 |
| 0 507 590 A1 | 10/1992 | European Pat. Off. | B01D 53/36 |
| 50-145381A | 11/1975 | Japan . | |
| 57-105240A | 6/1982 | Japan . | |
| 59-052530A | 3/1984 | Japan . | |
| 59-127649A | 7/1984 | Japan . | |
| 60-019036B4 | 5/1985 | Japan . | |
| 85031828A | 7/1985 | Japan . | |
| 60-232253A | 11/1985 | Japan . | |
| D71538/87 | 4/1987 | Japan . | |
| 63-007895A | 1/1988 | Japan . | |
| 63-077544A | 4/1988 | Japan . | |
| 63-205141A | 8/1988 | Japan . | |
| 63-240947A | 10/1988 | Japan . | |
| 01210032 | 8/1989 | Japan . | |
| WO95/00235 | 1/1995 | WIPO | B01D 53/36 |
| WO95/35152 | 12/1995 | WIPO | B01D 53/94 |
| WO96/17671 | 6/1996 | WIPO . | |

OTHER PUBLICATIONS

Schlatter, et al, "Three–Way Catalyst Response to Transients", Ind. Eng. Chem. Prod. Res. Dev., 1980, 19, 288–293 –no month.

Kim, G., "Ceria–Promoted Three–Way Catalysts for Auto Exhaust Emission Control", Ind. Eng. Chem. Prod. Res. Dev., 1982, 21, 267–274 –no month.

*Primary Examiner*—Walter D. Griffin
*Assistant Examiner*—Nadine Preisch
*Attorney, Agent, or Firm*—Richard A. Negin

[57] ABSTRACT

The present invention relates to an exhaust gas treatment catalytic article having an upstream catalytic zone and at least one downstream catalytic zone. The upstream catalytic zone has an upstream composition which has a first upstream support, and at least one first upstream palladium component. The upstream zone can have one or more layers. The downstream catalytic zone has a first downstream layer which has a first downstream support and a first downstream precious metal component. A second downstream layer has a second downstream support and a second downstream precious metal component.

51 Claims, 3 Drawing Sheets

U.S. PATENT DOCUMENTS

| | | | |
|---|---|---|---|
| 4,134,860 | 1/1979 | Hindin et al. | 252/466 |
| 4,157,316 | 6/1979 | Thompson et al. | 252/462 |
| 4,171,288 | 10/1979 | Keith et al. | 252/462 |
| 4,189,404 | 2/1980 | Keith et al. | 252/462 |
| 4,294,726 | 10/1981 | Bozon et al. | 252/462 |
| 4,367,162 | 1/1983 | Fujitani et al. | 252/443 |
| 4,438,219 | 3/1984 | Brandenburg et al. | 502/333 |
| 4,476,246 | 10/1984 | Kim et al. | 502/304 |
| 4,504,598 | 3/1985 | Ono et al. | 502/303 |
| 4,539,311 | 9/1985 | Harrison et al. | 502/304 |
| 4,587,231 | 5/1986 | Sawamura et al. | 502/304 |
| 4,591,518 | 5/1986 | Schillinger et al. | 427/385.5 |
| 4,591,578 | 5/1986 | Foley et al. | 502/185 |
| 4,591,580 | 5/1986 | Kim et al. | 502/303 |
| 4,624,940 | 11/1986 | Wan et al. | 502/251 |
| 4,708,946 | 11/1987 | Ohata et al. | 502/304 |
| 4,714,694 | 12/1987 | Wan et al. | 502/304 |
| 4,727,052 | 2/1988 | Wan et al. | 502/327 |
| 4,780,447 | 10/1988 | Kim et al. | 502/243 |
| 4,806,519 | 2/1989 | Chiba et al. | 502/252 |
| 4,808,564 | 2/1989 | Matsumoto et al. | 502/303 |
| 4,923,842 | 5/1990 | Summers | 502/261 |
| 4,931,419 | 6/1990 | Blanchard et al. | 502/304 |
| 4,965,243 | 10/1990 | Yamada et al. | 502/304 |
| 5,010,051 | 4/1991 | Rudy | 502/304 |
| 5,057,483 | 10/1991 | Wan | 502/304 |
| 5,106,588 | 4/1992 | Sims et al. | 422/180 |
| 5,179,059 | 1/1993 | Domesle et al. | 502/303 |
| 5,212,142 | 5/1993 | Dettling | 502/304 |
| 5,376,610 | 12/1994 | Takahata et al. | 502/66 |
| 5,510,086 | 4/1996 | Hemingway et al. | 422/171 |
| 5,597,771 | 1/1997 | Hu et al. | 502/304 |
| 5,948,377 | 9/1999 | Sung | 423/213.5 |
| 5,948,723 | 9/1999 | Sung | 502/303 |
| 5,981,427 | 11/1999 | Sung et al. | 502/325 |
| 5,989,507 | 11/1999 | Sung et al. | 423/213.5 |

EXHAUST GAS TREATMENT SYSTEM

BACKGROUND OF THE INVENTION

1. Field of the Invention

The present invention relates to a catalyst apparatus useful for the treatment of exhaust gases, including motor vehicle engine exhaust gases, to reduce contaminants contained therein. More specifically, the present invention is concerned with a catalyst apparatus comprising an upstream catalyst zone and a downstream catalyst zone with improved catalysts including a "three-way conversion" or "TWC" catalysts. TWC catalysts are polyfunctional in that they have the capability of substantially simultaneously catalyzing the oxidation of hydrocarbons and carbon monoxide and the reduction of nitrogen oxides.

2. Background of the Invention

Catalyst apparatus useful for the treatment of exhaust gases, including motor vehicle engine exhaust gases, to reduce contaminants contained therein which comprise an upstream catalyst zone and a downstream catalyst stages, also referred to as zones, are disclosed in the art as exemplified by U.S. Pat. Nos. 5,010,051; 5,106,588 and 5,510,086.

Three-way conversion catalysts have utility in a number of fields including the treatment of exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, catalytic converters containing a TWC catalyst are located in the exhaust gas line of internal combustion engines. The catalysts promote the oxidation by oxygen in the exhaust gas of the unburned hydrocarbons and carbon monoxide and the reduction of nitrogen oxides to nitrogen.

Known TWC catalysts which exhibit good activity and long life comprise one or more platinum group metals (e.g., platinum or palladium, rhodium, ruthenium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 3,993,572 discloses catalysts for promoting selective oxidation and reduction reactions. The catalyst contains platinum group metal, rare earth metal and alumina components which may be supported on a relatively inert carrier such as a honeycomb. Useful rare earth metals are disclosed to include ceria.

High surface area alumina materials, also referred to as "gamma alumina" or "activated alumina", typically exhibit a BET surface area in excess of 60 square meters per gram ("m$^2$/g"), often up to about 200 m$^2$/g or more. Such activated alumina is usually a mixture of the gamma and delta phases of alumina, but may also contain substantial amounts of eta, kappa and theta alumina phases. It is known to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina, or other support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al U.S. Pat. No. 4,171,288.

Bulk cerium oxide (ceria) is known to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan et al, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al and in U.S. Pat. No. 4,708,946 of Ohata et al.

U.S. Pat. No. 4,714,694 discloses alumina stabilized ceria catalyst compositions. There is disclosed a method of making a material which includes impregnating bulk ceria or a bulk ceria precursor with an aluminum compound and calcining the impregnated ceria to provide an aluminum stabilized ceria. The composition further comprises one or more platinum group catalytic components dispersed thereon.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,367,162 discloses a three-way catalyst system which comprises a carrier having a substructure of refractory material in the form of a honeycomb structure and a porous layer of a powder formed on the surface thereof selected from the group consisting of a powder of zirconium oxide and a mixed powder of zirconium oxide powder with at least powder selected from the group consisting of alumina, alumina-magnesia spinel and cerium oxide; and a catalyst ingredient supported thereon consisting of cerium oxide and a metal selected from the group consisting of platinum, palladium and mixtures thereof.

U.S. Pat. No. 4,438,219 discloses an alumina catalyst for use on a substrate. The catalyst is stable at high temperatures. The stabilizing material is disclosed to be one of several compounds including those derived from barium, silicon, rare earth metals, alkali and alkaline earth metals, boron, thorium, hafnium and zirconium. Of the stabilizing materials barium oxide, silicon dioxide and rare earth oxides which include lanthanum, cerium, praseodymium, neodymium, and others are indicated to be preferred. It is disclosed that contacting them with a calcined alumina film permits the calcined alumina film to retain a high surface area at higher temperatures.

U.S. Pat. Nos. 4,476,246, 4,591,578 and 4,591,580 disclose three-way catalyst compositions comprising alumina, ceria, an alkali metal oxide promoter and noble metals. U.S. Pat. Nos. 3,993,572 and 4,157,316 represent attempts to improve the catalyst efficiency of Pt/Rh based TWC systems by incorporating a variety of metal oxides, e.g., rare earth metal oxides such as ceria and base metal oxides such as nickel oxides. U.S. Pat. No. 4,591,518 discloses a catalyst comprising an alumina support with components deposited thereon consisting essentially of a lanthana component, ceria, an alkali metal oxide and a platinum group metal. U.S. Pat. No. 4,591,580 discloses an alumina supported platinum group metal catalyst. The support is sequentially modified to include support stabilization by lanthana or lanthana rich rare earth oxides, double promotion by ceria and alkali metal oxides and optionally nickel oxide.

Palladium containing catalyst compositions e.g. U.S. Pat. No. 4,624,940 have been found useful for high temperature applications. The combination of lanthanum and barium is found to provide a superior hydrothermal stabilization of alumina which supports the catalytic component, palladium. Thus, the palladium metal expulsion from the alumina due to phase transformation to encounter drastic sintering upon high temperature exposure is avoided. The use of particulate bulk metal oxide enhances catalytic activities. The bulk metal oxide consists of primarily ceria containing and/or ceria-zirconia containing particles. These particulate bulk metal oxides do not readily react with the stabilized alumina particles, thus, provide the catalytically promoting effect.

U.S. Pat. No. 4,780,447 discloses a catalyst which is capable of controlling HC, CO and $NO_x$ as well as $H_2S$ in emissions from the tailpipe of catalytic converter equipped automobiles. The use of the oxides of nickel and/or iron is known as a $H_2S$ gettering of compound.

In an article entitled "Three Way Catalyst Response To Transients" in *Ind. Eng. Chem. Prod. Res. Dev.,* 1980, 19, 288–293 the authors, Schlatter et al report that the operating environment of three-way catalysts is characterized by oscillations of the feed stream composition which occur with a frequency in the order of 1 Hz. It has been suggested that the incorporation of an "oxygen storage" component in the catalyst moderates the effects of the rapid changes between rich and lean exhaust stoichiometries. The authors also suggest that the presence of cerium on the rhodium-impregnated spheres in a "fresh" three-way catalyst enhances the performance of the catalyst under transient or oscillating feed stream conditions by increasing either the amount or the stability of the oxidized rhodium species. In a later article, published in the same journal, entitled "Ceria-Promoted Three-Way Catalysts for Auto Emission Control" *Ind. Eng. Chem. Prod. Res. Dev.,* 1982, 21, 274–288, the author, Kim reports that ceria is the best non-noble metal oxide promoter for a typical Pt-palladium-Rh TWC supported on alumina catalyst largely because it enhances the water-gas shift reaction ($CO+H_2O=CO_2+H_2$) and possibly due, in part, to the additional oxygen storage it provides to the TWC.

U.S. Pat. No. 4,539,311 discloses a catalyst for treating motor vehicle exhaust fumes which catalyst is said to have an improved tolerance for lead. A high surface area alumina is impregnated first with a barium moiety, such as an aqueous solution of a barium compound which decomposes to produce barium oxide on firing at over 400° C., and, after such firing, is subsequently impregnated with a dispersion of a platinum group metal moiety such as by soaking the alumina in an aqueous solution of a metal compound which on firing at over 400° C. decomposes to leave behind either the platinum group metal or a compound which converts to the metal when the catalyst is placed in use. The catalyst is made by coating a honeycomb support with alumina incorporating ceria. The dried and calcined alumina coating is then soaked in an aqueous solution of barium nitrate, dried and fired and then soaked in an aqueous solution of chloroplatinic acid, dried and fired. The firing steps are carried out at 550° C.

U.S. Pat. No. 4,294,726 discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500 to 700° C. in air after which the material is impregnated with an aqueous solution of a salt of platinum and a salt of rhodium dried and subsequently treated in a hydrogen-containing gas at a temperature of 250–650° C. The alumina may be thermally stabilized with calcium, strontium, magnesium or barium compounds. The ceria-zirconia-iron oxide treatment is followed by impregnating the treated carrier material with aqueous salts of platinum and rhodium and then calcining the impregnated material.

U.S. Pat. No. 4,965,243 discloses a method to improve thermal stability of a TWC catalyst containing precious metals by incorporating a barium compound and a zirconium compound together with ceria and alumina. This is stated to form a catalytic moiety to enhance stability of the alumina washcoat upon exposure to high temperature.

J01210032 and AU-615721 disclose a catalytic composition comprising palladium, rhodium, active alumina, a cerium compound, a strontium compound and a zirconium compound. These patents suggests the utility of alkaline earth metals in combination with ceria, zirconia to form a thermally stable alumina supported palladium containing washcoat.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g. co-precipitated) ceria oxide-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 4,504,598 discloses a process for producing a high temperature resistant TWC catalyst. The process includes forming an aqueous slurry of particles of gamma or activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

U.S. Pat. Nos. 3,787,560, 3,676,370, 3,552,913, 3,545,917, 3,524,721 and 3,899,444 all disclose the use of neodymium oxide for use in reducing nitric oxide in exhaust gases of internal combustion engines. U.S. Pat. No. 3,899,444 in particular discloses that rare earth metals of the lanthanide series are useful with alumina to form an activated stabilized catalyst support when calcined at elevated temperatures. Such rare earth metals are disclosed to include lanthanum, ceria, cerium, praseodymium, neodymium and others.

TWC catalyst systems comprising a carrier and two or more layers of refractory oxide are disclosed.

For example, Japanese Patent Publication No. 145381/1975 discloses a catalyst-supported structure for purifying exhaust gases comprising a thermally insulating ceramic carrier and at least two layers of catalyst containing alumina or zirconia, the catalysts in the catalyst containing alumina or zirconia layers being different from each other.

Japanese Patent Publication No. 105240/1982 discloses a catalyst for purifying exhaust gases containing at least two kinds of platinum-group metals. The catalyst comprising at least two carrier layers of a refractory metal oxide each containing a different platinum-group metal. There is a layer of a refractory metal oxide free from the platinum-group metal between the carrier layers and/or on the outside of these carrier layers.

Japanese Patent Publication No. 52530/1984 discloses a catalyst having a first porous carrier layer composed of an inorganic substrate and a heat-resistant noble metal-type catalyst deposited on the surface of the substrate and a second heat-resistant non-porous granular carrier layer having deposited thereon a noble metal-type catalyst, said second carrier layer being formed on the surface of the first carrier layer and having resistance to the catalyst poison.

Japanese Patent Publication No. 127649/1984 discloses a catalyst for purifying exhaust gases, comprising an inorganic carrier substrate such as cordierite, an alumina layer formed on the surface of the substrate and having deposited thereon at least one rare earth metal such as lanthanum and cerium and at least one of platinum and palladium, and a second layer formed on the aforesaid first alumina-based layer and having deposited thereon a base metal such as iron or nickel, at least one rare earth metal such as lanthanum, and rhodium.

Japanese Patent Publication No. 19036/1985 discloses a catalyst for purifying exhaust gases having an enhanced ability to remove carbon monoxide at low temperatures, said catalyst comprising a substrate composed, for example, of cordierite and two layers of active alumina laminated to the surface of the substrate, the lower alumina layer containing platinum or vanadium deposited thereon, and the upper alumina layer containing rhodium and platinum, or rhodium and palladium, deposited thereon.

Japanese Patent Publication No. 31828/1985 discloses a catalyst for purifying exhaust gases, comprising a honeycomb carrier and a noble metal having a catalytic action for purifying exhaust gases, the carrier being covered with an inside and an outside alumina layer, the inside layer having more noble metal adsorbed thereon than the outside layer; and a process for production of this catalyst.

Japanese Patent Publication No. 232253/1985 discloses a monolithic catalyst for purifying exhaust gases being in the shape of a pillar and comprising a number of cells disposed from an exhaust gas inlet side toward an exhaust gas outlet side. An alumina layer is formed on the inner wall surface of each of the cells, and catalyst ingredients are deposited on the alumina layer. The alumina layer consists of a first alumina layer on the inside and a second alumina layer on the surface side, the first alumina layer having palladium and neodymium deposited thereon, and the second alumina layer having platinum and rhodium deposited thereon.

Japanese Kokai 71538/87 discloses a catalyst layer supported on a catalyst carrier and containing one catalyst component selected from the group consisting of platinum, palladium and rhodium. An alumina coat layer is provided on the catalyst layer. The coat layer contains one oxide selected from the group consisting of cerium oxide, nickel oxide, molybdenum oxide, iron oxide and at least one oxide of lanthanum and neodymium (1–10% by wt.).

U.S. Pat. Nos. 3,956,188 and 4,021,185 disclose a catalyst composition having (a) a catalytically active, calcined composite of alumina, a rare earth metal oxide and a metal oxide selected from the group consisting of an oxide of chromium, tungsten, a group IVB metal and mixtures thereof and (b) a catalytically effective amount of a platinum group metal added thereto after calcination of said composite. The rare earth metals include cerium, lanthanum and neodymium.

U.S. Pat. No. 4,806,519, discloses a two layer catalyst structure having alumina, ceria and platinum on the inner layer and aluminum, zirconium and rhodium on the outer layer.

JP-88-240947 discloses a catalyst composite which includes an alumina layer containing ceria, ceria-doped alumina and at least one component selected from the group of platinum, palladium and rhodium. There is a second layer containing lanthanum-doped alumina, praseodymium-stabilized zirconium, and lanthanum oxide and at least one component selected from the group of palladium and rhodium. The two layers are placed on a catalyst carrier separately to form a catalyst for exhaust gas purification.

Japanese Patent J-63-205141-A discloses a layered automotive catalyst in which the bottom layer comprises platinum or platinum and rhodium dispersed on an alumina support containing rare earth oxides, and a top coat which comprises palladium and rhodium dispersed on a support comprising alumina, zirconia and rare earth oxides.

Japanese Patent J-63-077544-A discloses a layered automotive catalyst having a first layer comprising palladium dispersed on a support comprising alumina, lanthana and other rare earth oxides and a second coat comprising rhodium dispersed on a support comprising alumina, zirconia, lanthana and rare earth oxides.

Japanese Patent J-63-007895-A discloses an exhaust gas catalyst comprising two catalytic components, one comprising platinum dispersed on a refractory inorganic oxide support and a second comprising palladium and rhodium dispersed on a refractory inorganic oxide support.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by a thermal decomposition. Optionally, a zirconia powder may be added to the coating slip.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

U.S. Pat. No. 4,923,842 discloses a catalytic composition for treating exhaust gases comprising a first support having dispersed thereon at least one oxygen storage component and at least one noble metal component, and having dispersed immediately thereon an over layer comprising lanthanum oxide and optionally a second support. The layer of catalyst is separate from the lanthanum oxide. The nobel metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

U.S. Pat. No. 5,057,483 discloses a catalyst composition suitable for three-way conversion of internal combustion engine, e.g., automobile gasoline engine, exhaust gases includes a catalytic material disposed in two discrete coats on a carrier. The first coat includes a stabilized alumina support on which a first platinum catalytic component is dispersed and bulk ceria, and may also include bulk iron oxide, a metal oxide (such as bulk nickel oxide) which is effective for the suppression of hydrogen sulfide emissions, and one or both of baria and zirconia dispersed throughout the first coat as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support.

It is a continuing goal to develop a three-way catalyst system which is inexpensive and stable. At the same time the system should have the ability to oxidize hydrocarbons and carbon monoxide while reducing nitrogen oxides to nitrogen.

SUMMARY OF THE INVENTION

The present invention relates to a catalytic exhaust gas treatment article particularly useful for treatment of motor vehicle exhaust gases. The exhaust gas treatment article comprises an upstream catalytic zone and at least one downstream catalytic zone. The upstream catalytic zone comprises an upstream composition and the downstream catalytic zone comprises an downstream stream composition. The two catalyst zones can be on separate substrate carriers such as separate monoliths, preferably honeycombs. Alternatively, the two catalyst zones can be on the same substrate carrier. The purpose of the mechanical design of the article of the present invention is to construct an article and/or provide chemical compositions which enable the upstream zone to begin to oxide oxidizable components of the exhaust gas, such as carbon monoxide and hydrocarbons and/or reduce reducible components of the exhaust gas, such as nitrogen oxides at a lower temperature than in the downstream zone.

In accordance with the present invention this can be accomplished by the use of catalytic compositions in the first zone designed to catalyze the oxidation and/or reduction of components in the exhaust gas at a lower temperature in the downstream zone than the upstream zone composition. The downstream zone composition is designed to more efficiently catalyze the reaction of the exhaust gas components once the gas reaches steady state operating temperatures.

A preferred upstream composition comprises a first upstream support, and at least one first upstream palladium component located on the support. The downstream catalytic zone comprises a first downstream support, and at least one first downstream platinum group component located on the support. Preferably, there is a first downstream layer comprising a first downstream support and at least one first downstream platinum group component, and a second downstream layer comprising a second downstream support and at least one second downstream platinum component. The first and second platinum group metal components can be the same or different and comprise components selected from the group consisting of rhodium, platinum and palladium. More preferably, at least one of the first and second downstream platinum group components comprises a palladium component.

UPSTREAM CATALYST

In preferred embodiments, the upstream zone of the present invention comprises a thermally stable upstream catalyst article, stable up to 900° C. or more. The upstream catalyst article preferably comprises a catalyst, which can be a single layered or multi-layered catalyst composite of the type generally referred to as a three-way conversion catalyst or TWC catalyst. The upstream zone catalyst article comprises at least one layer comprising a palladium component which can include a palladium metal and/or a palladium compound such as palladium oxide. Where a single layer is used the upstream catalyst composition is preferably substantially free of an oxygen storage component. The single upstream layer composition can contain an oxygen storage component which is free from intimate contact with the palladium component.

A preferred upstream catalyst composite is disclosed in commonly assigned U.S. Ser. No. 08/265,076 herein incorporated by reference. These TWC catalysts are polyfunctional in that they have the capability of substantially simultaneously catalyzing the oxidation of hydrocarbons and carbon-monoxide and the reduction of nitrogen oxides. The relative layers of the upstream catalyst composite and the specific composition of such upstream layer provide a stable, economical system. This enables the maintenance of effective oxidation of hydrocarbons and carbon monoxide as well as enhanced conversion of nitrogen oxide compounds even where palladium is the only platinum metal group component in the composite.

The structure of a preferred upstream layered catalyst composite of the present invention is designed wherein there is a first upstream layer having a first upstream layer composition and a second upstream layer having a second upstream layer composition. The first upstream layer is also referred to as the bottom or inner upstream layer and the second upstream layer referred to as the top or outer upstream layer. Exhaust gaseous emissions comprising hydrocarbons, carbon monoxide and nitrogen oxides first encounter the second or top upstream layer. In the top upstream layer, the platinum group metal acts to catalyze the reduction of nitrogen oxides to nitrogen and the oxidation of hydrocarbons. The top layer can comprise an oxygen storage component such as ceria. However, it is preferred that the ceria is not in intimate contact with the platinum group metal in the top layer. This can be accomplished by making the top layer with a ceria-zirconia composite and not a solution of a soluble ceria salt. The composite oxygen storage composition is in bulk form. By bulk form it is meant that a composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. No. 5,057,483 both hereby incorporated by reference.

Upon passing through the top or second upstream layer, the exhaust gas then contacts the first or bottom upstream layer. In this layer, the platinum group metal is in intimate contact with an oxygen storage component, such as ceria. This can be accomplished by introducing the cerium component into the bottom upstream layer composition in the form of a solution of soluble cerium salt which impregnates the support and other particulate materials. The cerium salt is converted to cerium oxide (ceria) upon calcining. The ceria, preferably in intimate contact with the platinum group metal, is believed to enhance oxidation and reduction reactions. By intimate contact it is meant that an effective amount of the components in such contact (e.g., the platinum group metal component and oxygen storage component in the bottom layer) are on the same support and/or are in direct contact. By non-intimate contact (or being physically separate) the component (e.g., ceria and platinum group component in the top layer) are not on the same support or are not comprised in the same particles.

The present invention includes a layered upstream catalyst composite comprising a first upstream layer and a second upstream layer. The first upstream layer comprises a first upstream support. The first layer comprises a first upstream palladium component and optionally, at least one first upstream platinum group metal component other than palladium, an upstream oxygen storage component in intimate contact with the platinum group metal component in the first upstream layer. Preferably, the first upstream layer additionally comprises a first upstream zirconium component, at least one first upstream alkaline earth metal component, and at least one first upstream rare earth metal component selected from the group consisting of lanthanum metal components and neodymium metal components.

The second upstream layer preferably comprises a second upstream palladium component and optionally, at least one second upstream platinum group metal component other than palladium. Preferably the second upstream layer additionally comprises a second upstream zirconium component, at least one second upstream alkaline earth metal component, and at least one second upstream rare earth metal component selected from the group consisting of lanthanum metal components and neodymium metal components. Preferably, each upstream layer contains a zirconium component, at least one of the alkaline earth metal components and the rare earth component. Most preferably, each upstream layer includes both at least one alkaline earth metal component and at least one rare earth component. The first upstream layer optionally further comprises a second upstream oxygen storage composition which comprises a second oxygen storage component. The second oxygen storage component and/or the second oxygen storage composition are preferably in bulk form and can also in intimate contact with the first platinum group metal component.

In a specific and preferred embodiment of the present invention. The first upstream platinum group metal consists essentially of a first upstream palladium component which is substantially the only platinum group metal component in the first upstream layer. In this preferred embodiment the second upstream platinum group metal component consists essentially of a second palladium component wherein the second palladium component is substantially the only platinum group metal component in the second upstream layer.

Optionally, the first and/or the second upstream layers comprise an upstream oxygen storage composite in particulate form. The upstream oxygen storage composite preferably comprises ceria and zirconia and optionally and yet more preferably a rare earth component selected from the group consisting of lanthanum and neodymium components and mixtures thereof. A particularly preferred composite comprises ceria, neodymia, and zirconia. Preferably there is from 60 to 90 weight percent zirconia, 10 to 30 weight percent ceria, and up to 10 weight percent neodymia. The ceria in the composite not only behaves as an oxygen storage component enhancing oxidation of carbon monoxide and the reduction of nitric oxides but also helps to stabilize the zirconia by preventing it from undergoing undesirable phase transformation. As indicated above, the specific and preferred composition of the present invention is one wherein the first and second layers require respectively a first palladium component and a second palladium component. Optionally the first upstream layer can further comprise at least one additional platinum group metal component which preferably selected from the group consisting of platinum, rhodium, ruthenium, and iridium components with preferred additional first layer platinum group metal components being selected from the group consisting of platinum and rhodium and mixtures thereof.

Similarly the second upstream layer can further comprise, in addition to a second palladium component, at least one second platinum group metal component, preferably selected from the group consisting of platinum, rhodium, ruthenium, and iridium components, with platinum and rhodium components being preferred.

As indicated, according to the present invention the first upstream layer comprises a first oxygen storage component which is preferably in intimate contact with the first platinum group metal which comprises palladium and preferably consists substantially only of palladium. Additionally there can be a first upstream bulk oxygen storage component such as bulk ceria, bulk praseodymia, and/or an oxygen storage composite such as a ceria zirconia particulate composite.

The second upstream layer comprises a second platinum group metal component which comprises palladium and most preferably consists essentially of palladium. In the second upstream layer the oxygen storage component if present is preferably not in intimate contact with the platinum group metal component and preferably includes a bulk second oxygen storage composite which can comprise a composite of ceria, zirconia, and optionally and preferably a rare earth metal oxide such as neodymia or lanthana.

In a specific and preferred embodiment the first upstream layer comprises a first upstream support; at least one first upstream platinum group metal component comprising a first upstream palladium component dispersed on the first upstream support; and an upstream oxygen storage component, preferably ceria, in intimate contact with the upstream platinum group metal component; at least one upstream alkaline earth metal component, at least one upstream zirconium component and at least one upstream first rare earth metal component selected from the group consisting of lanthanum metal components and neodymium metal components. The second upstream layer comprises a second upstream support which can be the same or different than the first upstream support; at least one second upstream platinum group metal dispersed on the second support comprising a second palladium component; at least one second upstream alkaline earth metal components which can be the same or different than the first alkaline earth metal component; at least one second upstream zirconium component; and at least one second upstream rare earth metal component selected from the group consisting of lanthanum metal components and neodymium metal components which can be different from that of the first rare earth metal component.

Preferred first and second upstream supports can be the same or different compounds selected from the group consisting of silica, alumina, and titania compounds. More preferably the first and second upstream supports are activated compounds selected from the group consisting of alumina, silica, silica-alumina, alumino-silicates, alumina-zirconia, alumina-chromia, and alumina-ceria. First and second upstream supports are most preferably activated alumina.

Alkaline earth metals are believed to stabilize the first and second upstream layer compositions, and rare earth metal components selected from lanthanum and neodymium components are believed to promote the catalytic activity of the first and second upstream layer compositions. Zirconium component in both upstream layers act as both washcoat stabilizer and promoter.

The specific construction of upstream layers having the first and second upstream compositions has been found to result in an effective three-way catalyst even when used with palladium as the sole platinum group metal in each layer. The composite can be in the form of a self-supported article such as a pellet with the first layer on the inside and the second layer on the outside of the pellet. Alternatively, and more preferably, the first layer is supported on a carrier, also referred to as a substrate, preferably a honeycomb substrate, and the second layer is supported on the first layer applied to the substrate.

The at least one first and at least one second upstream alkaline earth metal can be selected from the group consisting of magnesium, barium, calcium and strontium, preferably strontium and barium. Most preferably, the first alkaline earth metal component comprises barium oxide and the second alkaline earth metal component comprises strontium oxide. Stabilization means that the conversion efficiency of the catalyst composition of each layer is maintained for longer period of time at elevated temperatures. Stabilized supports such as alumina and catalytic components such as noble metals are more resistant to degradation against high temperature exposure thereby maintaining better overall conversion efficiencies.

The first upstream layer composition and second upstream layer composition further respectively and preferably comprise first and second rare earth metal components which are believed to act as promoters. The rare earth metal components are derived from a metal selected from the group consisting of lanthanum and neodymium. In a specific embodiment, the first rare earth metal component is substantially lanthana and the second rare earth component is substantially neodymia. The promoter enhances the conversion of the hydrocarbons, carbon monoxide and nitrogen oxides to harmless compounds.

In specific and preferred embodiments the first and/or second layers further comprise nickel or iron components useful to remove sulfides such as hydrogen sulfides emissions. Most preferably, the first layer comprises a nickel or iron compound.

When the compositions are applied as a thin coating to a monolithic carrier substrate, the proportions of ingredients are conventionally expressed as grams of material per cubic inch of the catalyst and the substrate. This measure accommodates different gas flow passage cell sizes in different monolithic carrier substrates. Platinum group metal components are based on the weight of the platinum group metal.

A useful and preferred first upstream layer has:
from about 0.003 to about 0.6 g/in$^3$ of at least one palladium component;
from 0 to about 0.065 g/in$^3$ of at least one first platinum and/or first rhodium component;
from about 0.15 to about 2.0 g/in$^3$ of a first support;
from about 0.05 to about 2.0 g/in$^3$ of the total of the first oxygen storage components in the first layer;
from 0.0 and preferably about 0.025 to about 0.5 g/in$^3$ of at least one first alkaline earth metal component;
from 0.0 and preferably about 0.025 to about 0.5 g/in$^3$ of a first zirconium component; and
from 0.0 and preferably about 0.025 to about 0.5 g/in$^3$ of at least one first rare earth metal component selected from the group consisting of ceria metal components, lanthanum metal components and neodymium metal component.

A useful and preferred second upstream layer has:
from about 0.003 g/in$^3$ to about 0.6 g/in$^3$ of at least one second palladium component;
from 0.0 g/in$^3$ to about 0.065 g/in$^3$ of at least one first$^3$ platinum and/or rhodium component;
from about 0.15 g/in$^3$ to about 2.0 g/in of a second support;
from 0.0 and preferably about 0.025 g/in$^3$ to about 0.5 g/in$^3$ of at least one second rare earth metal component selected from the group consisting of lanthanum metal components and neodymium metal components;
from 0.0 and preferably about 0.25 g/in$^3$ to about 0.5 g/in$^3$ of at least one second alkaline earth metal component; and
from 0.0 and preferably about 0.025 to about 0.5 g/in$^3$ of a second zirconium component. However, the first layer requires an alkaline earth metal component and/or a rare earth component, and the second layer requires an alkaline earth metal component and/or a rare earth metal component.

The first and/or second layer can have from 0.0 to about 2.0 g/in$^3$ of an oxygen storage composite comprising particulate form of cera-zirconia composite.

The layered upstream catalyst composite can be in the form of a self-supported article such as a pellet with the first layer on the inside and the second layer on the outside of the pellet. Alternatively, and more preferably, the first upstream layer can be supported on a substrate, preferably a honeycomb carrier, and the second upstream layer is supported on the first upstream layer applied on the substrate.

DOWNSTREAM CATALYST

In preferred embodiments, the downstream zone of the present invention comprises a thermally stable downstream catalyst article, stable up to 900° C. or more. The downstream catalyst article preferably comprises a catalyst, which can be a single layered or multi-layered catalyst composite of the type generally referred to as a three-way conversion catalyst or TWC catalyst. The downstream zone catalyst article preferably comprises at least one layer comprising a palladium component and at least one additional precious metal component. Preferred additional precious metal components can be at least one additional precious metal component selected from platinum group metals, gold and silver. The additional metal is preferably a platinum group metal, preferably selected from platinum and/or rhodium. Most preferably, the platinum group metal comprises rhodium. The term component can include a metal and/or a compound such as palladium oxide.

A preferred downstream catalyst composite is disclosed in commonly assigned U.S. Ser. No. 08/563,884 herein incorporated by reference.

There is a downstream first layer also referred to as a bottom or inner downstream layer and a second downstream layer also referred to as a top or outer downstream layer. The first downstream layer comprises at least one first palladium component. The first downstream layer can optionally contain minor amounts of a platinum component based on the total platinum metal of the platinum components in the first and second layers. The second downstream layer comprises at least two second platinum group metal components with one of the platinum group metal components being a second platinum component and the other being a rhodium component. The second downstream layer preferably comprises a second downstream oxygen storage composition which comprises a diluted second oxygen storage component. The second downstream oxygen storage composition comprises a diluent in addition to the oxygen storage component. Useful and preferred diluents include refractory oxides. Diluted is used to mean that the second downstream oxygen storage component is present in the oxygen storage composition in relatively minor amounts. The composition is a mixture which can be characterized as a composite which may or may not be a true solid solution. The second downstream oxygen storage component is diluted to minimize interaction with the rhodium component. Such interaction may reduce long term catalytic activity.

Exhaust gas emissions comprising hydrocarbons, carbon monoxide and nitrogen oxides first encounter the second downstream layer. In preferred layer compositions, the second platinum component and the rhodium component in the second downstream layer is believed to catalyze the reduction of nitrogen oxides to nitrogen and the oxidation of hydrocarbons and carbon monoxide. The second platinum component in the top coat is believed to promote the rhodium component, to increase rhodium's catalytic activity. The second downstream layer preferably comprises a second downstream oxygen storage composition comprising a second oxygen storage component such as rare earth oxide, preferably ceria. The second downstream oxygen storage component is diluted with a diluent such as a refractory metal oxide, preferably zirconia. A particularly preferred second downstream oxygen storage composition is a co-precipitated ceria/zirconia composite. There is preferably up to 30 weight percent ceria and at least 70 weight percent zirconia. Preferably, the oxygen storage composition comprises ceria, and one or more of lanthana, neodymia, yttria or mixtures thereof in addition to ceria. A particularly preferred particulate composite comprises ceria, neodymia and zirconia. Preferably there is from 60 to 90 wt. % zirconia, 10–30% ceria and up to 10% neodymia. The ceria not only stabilizes the zirconia by preventing it from undergoing undesirable phase transformation, but also behaves as an oxygen storage component enhancing oxidation of carbon monoxide and the reduction of nitric oxides.

Preferably, the second downstream oxygen storage composition is in bulk form. By bulk form it is meant that the composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. Nos. 4,714,694 and 5,057,483 both hereby incorporated by reference.

Both the second downstream platinum component and the second downstream rhodium component are also believed to interact with and increase the effectiveness of the second downstream oxygen storage component in the second oxygen storage composition.

Upon passing through the top or second layer, the exhaust gas then contacts the first or bottom downstream layer. In the preferred bottom downstream layer, the first downstream palladium component and the optional first downstream platinum component are believed to primarily enhance oxidation reactions. These reactions can be promoted by a first oxygen storage component such as ceria group compounds, preferably cerium oxide which can be in a bulk first oxygen storage composition form as used in the top layer, or be an oxygen storage component in intimate contact with the first platinum group metal component. Such intimate contact can be achieved by solution impregnation of the oxygen storage component onto the platinum group metal component.

A specific and preferred embodiment of the present invention relates to a downstream layered catalyst composite comprising a first downstream layer which comprises a first downstream support having at least one palladium component and from 0 to less than fifty weight percent based on platinum metal of at least one first layer platinum component based on the total amount of platinum metal in the first and second downstream layers.

Preferably, the first downstream layer comprises a first support, a first palladium component, at least one first stabilizer, and at least one first rare earth metal component selected from ceria, neodymia and lanthana. The first downstream layer can also comprise a first oxygen storage composition which comprises a first downstream oxygen storage component. The second downstream layer preferably comprises a second downstream support, at least one second downstream platinum component, at least one rhodium component, and a second downstream oxygen storage composition. There can be from fifty to one hundred weight percent based on platinum metal of the second layer platinum component based on the total amount of platinum metal in the first and second downstream layers.

The platinum group metal component support components in the first and second downstream layers can be the same or different and are preferably compounds selected from the group consisting of silica, alumina and titania compounds. Preferred first and second downstream supports can be activated compounds selected from the group consisting of alumina, silica, silica-alumina, alumino-silicates, alumina-zirconia, alumina-chromia, and alumina-ceria.

The second downstream oxygen storage component and optional first downstream oxygen storage component are preferably selected from the cerium group and preferably consist of cerium compounds, praseodymium, and/or neodymium compounds. When using cerium group compounds it has been found that if sulfur is present in the exhaust gas stream, objectionable hydrogen sulfide can form. When it is preferred to minimize hydrogen sulfide, it is preferred to additionally use Group IIA metal oxides, preferably strontium oxide and calcium oxide. Where it is desired to use cerium, praseodymium or neodymium compounds at least one of the first or second downstream layers can further comprise a nickel or iron component to suppress hydrogen sulfide. Preferably, the first downstream layer further comprises a nickel or iron component.

Stabilizers can be in either the first or second downstream layers, and are preferably in the first downstream layer. Stabilizers can be selected from at least one alkaline earth metal component derived from a metal selected from the group consisting of magnesium, barium, calcium and strontium, preferably strontium and barium.

Zirconium components in the first and/or second downstream layers is preferred and acts as both a stabilizer and a promoter. Rare earth oxides act to promote the catalytic activity of the first layer composition. Rare earth metal components are preferably selected from the group consisting of lanthanum metal components and neodymium metal components.

When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. Platinum group metal components are based on the weight of the platinum group metal.

A useful and preferred first downstream layer has:

from about 0.0175 to about 0.3 g/in$^3$ of palladium component;

from about 0 to about 0.065 g/in$^3$ of a first platinum component;

from about 0.15 to about 2.0 g/in$^3$ of a first support;

from about 0.025 to about 0.5 g/in$^3$ of at least one first alkaline earth metal component;

from about 0.025 to about 0.5 g/in$^3$ of a first zirconium component; and from about 0.025 to about 0.5 g/in$^3$ of at least one first rare earth metal component selected from the group consisting of ceria metal components, lanthanum metal components and neodymium metal component.

A useful and preferred second downstream layer has:

from about 0.001 g/in$^3$ to about 0.03 g/in$^3$ of a rhodium component;

from about 0.001 g/in$^3$ to about 0.15 g/in$^3$ of platinum;

from about 0.15 g/in$^3$ to about 1.5 g/in$^3$ of a second support;

from about 0.1 to 2.0 g/in$^3$ of a second oxygen storage composition;

from about 0.025 g/in$^3$ to about 0.5 g/in$^3$ of at least one second rare earth metal component selected from the group consisting of lanthanum metal components and neodymium metal components; and from about 0.025 to about 0.5 g/in$^3$ of a second zirconium component.

The composite can be in the form of a self-supported article such as a pellet with the first layer on the inside and the second layer on the outside of the pellet. Alternatively, and more preferably, the first downstream layer can be supported on a substrate, preferably a honeycomb carrier, and the second downstream layer is supported on the first layer applied on the substrate.

In an alternate embodiment, the downstream zone is designed to have a greater thermal mass than the upstream zone. For the purpose of the present invention, thermal mass is defined as the mass of the upstream or downstream zone times the heat capacity of the respective zone. This design is particularly preferred when combined with the catalytic composition as recited above for use in the respective zones. Where upstream and downstream honeycomb monoliths are made of the same or similar materials, useful upstream monoliths have axial length ranges of from 0.5 to 3.0, 0.5 to 2.5, 0.5 to 2.0, 1.0 to 2.0 and 1.0 to 3.0 inches long. Preferred ceramic upstream honeycomb monoliths have a length of from 2.0 to 3.0 inches long, with monoliths of 2.5 inches long being commercially available. A significant factor affecting the thermal mass of the upstream and downstream zones is the material the substrate is made from. A useful embodiment comprises an upstream honeycomb made of metal and a downstream monolith made of ceramic. The ceramic honeycombs tend to have greater heat capacities. Other parameters affecting the thermal mass are the number of cells per square inch (cpsi), catalyst loading and honeycomb wall thicknesses which vary from 0.001 to 0.008 inches. Ceramic monoliths typically have wall thicknesses ranging from 0.002 to 0.014 inches, and metal monoliths typically have wall thicknesses ranging from 0.0015 to 0.003 inches. Useful honeycomb flowthrough monoliths have from 300 to 600 cpsi. Depending on wall thickness, etc. a higher cpsi monolith has a higher thermal mass. The present invention can use an upstream monolith having a lower cpsi in the monolith than the downstream monolith. The smaller upstream monolith will thereby heat up faster.

Preferably, the composition of the smaller upstream zone is designed to have a lower light-off temperature than the downstream zone. Thereby, the upstream zone heats up and catalyzes the reaction sooner. It is also designed to operate during conditions, such as during idle, when residence time may be longer, and space velocities may be lower than during steady state operation. For the purpose of the present invention the term "light-off" shall mean the temperature at which the catalyst becomes active and can initiate the reaction of the exhaust gas components. Stated another way the residence time is indicated by the reciprocal of the space velocity. For the purpose of the present invention the term "space velocity" shall mean volume of gas that passes through the catalytic monolith in a given time period divided by the total volume of the catalytic monolith and is measured in reciprocal time units such as reciprocal hours. The catalytic article of the present invention can advantageously be used at space velocities ranging from 10 to 500,000 and more typically from 50 to 350,000 reciprocal hours.

The present invention includes a method comprising the steps of treating a gas comprising nitrogen oxide, carbon monoxide and/or hydrocarbon by contacting the gas with a layered catalyst composite as recited above.

The present invention also includes a methods of preparation of the catalytic article and layered catalyst composites of the present invention.

DETAILED DESCRIPTION OF THE PREFERRED EMBODIMENTS

Figure 1:
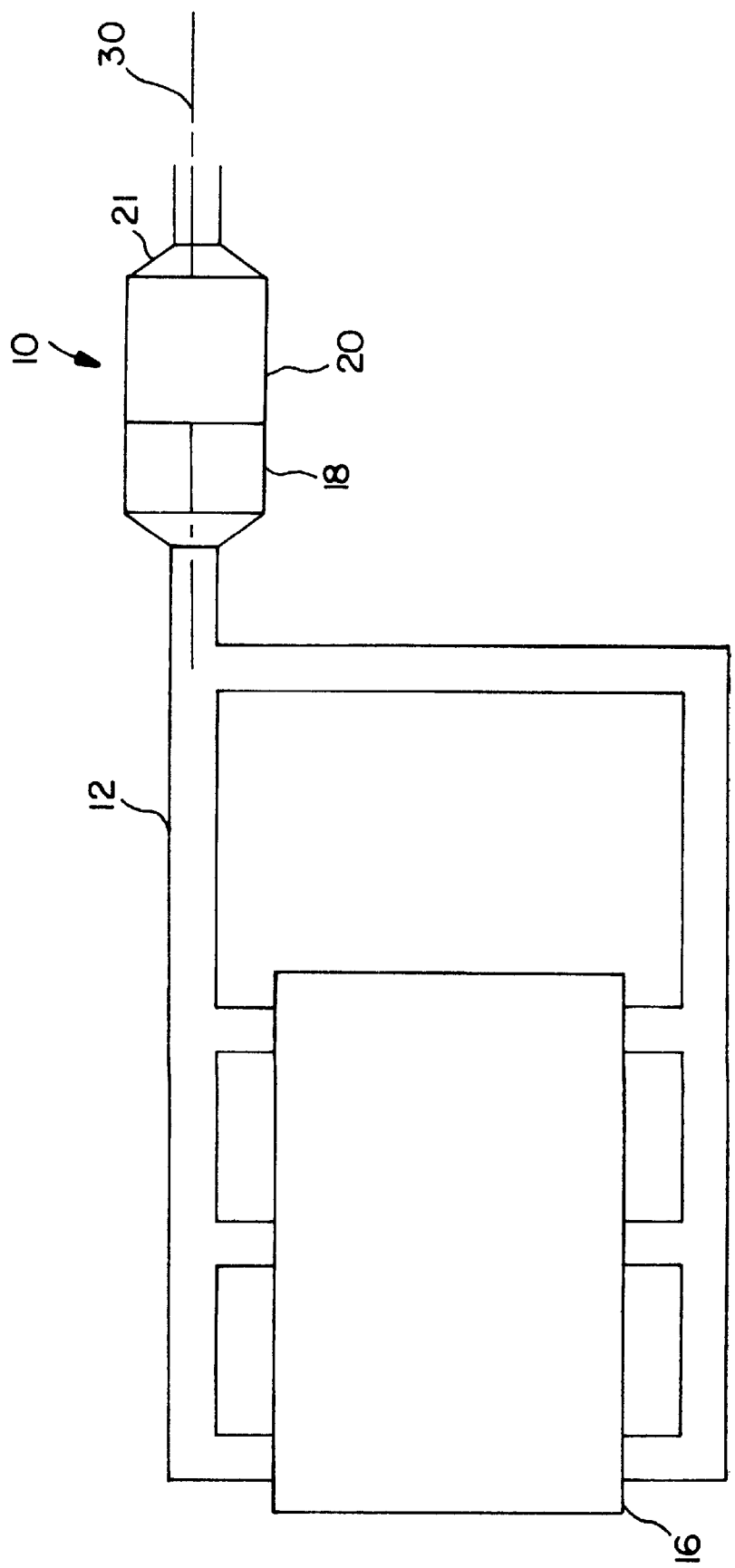
FIG. 1 is a schematic view showing an upstream honeycomb and a downstream honeycomb which are adjacent in a canister located within an exhaust stream.
Figure 2:
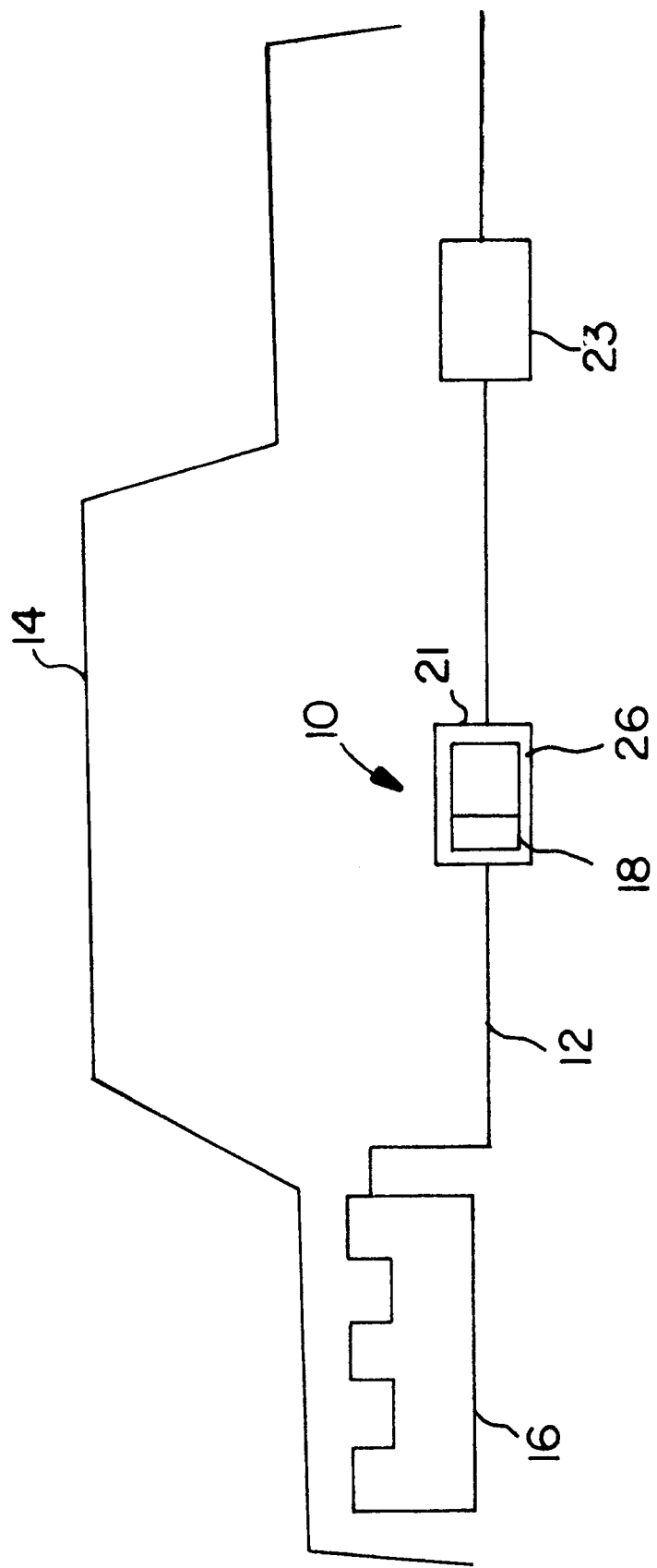
FIG. 2 shows the article of FIG. 1 in an underfloor position in a motor vehicle.
Figure 3:
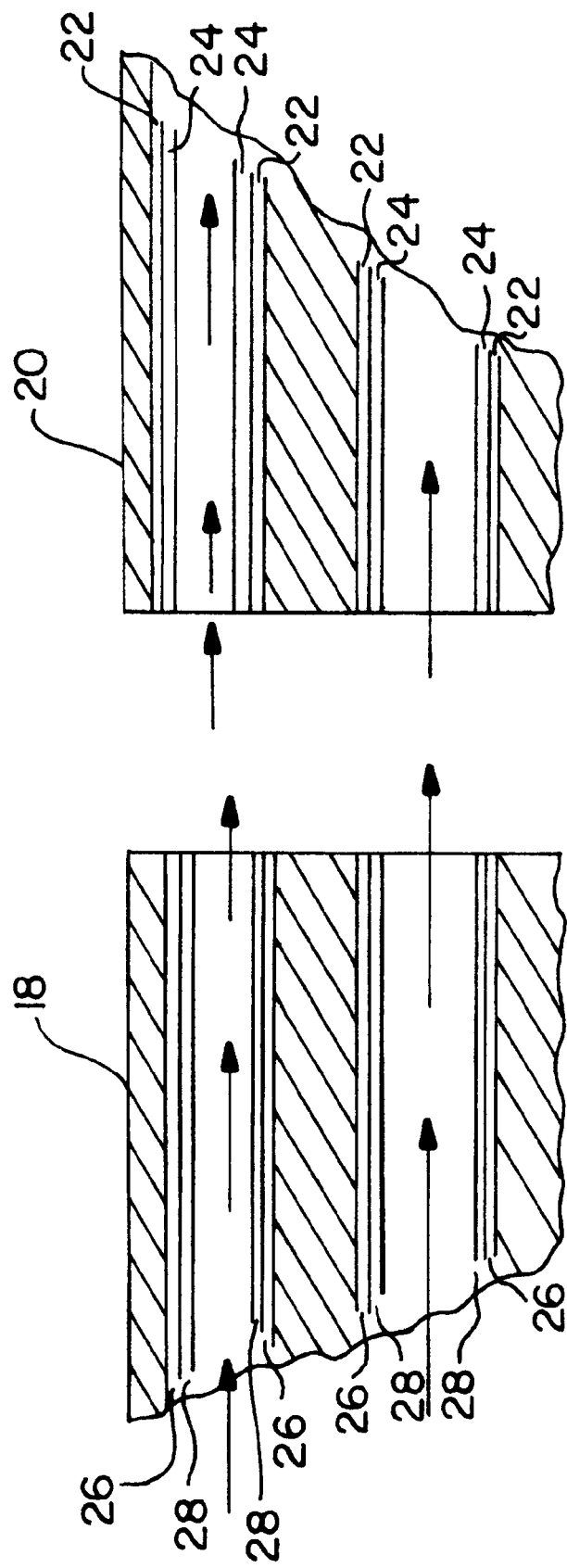
FIG. 3 is a schematic, sectional view of an upstream honeycomb and a downstream honeycomb showing upstream and downstream catalyst layers.

The present invention will be understood by those skilled in the art by reference to the present description taken with the reference to FIGS. 1–3.

The present invention relates to an exhaust gas treatment catalytic article 10. The catalytic article 10 is located in communication with an exhaust gas line 12 leading from a motor vehicle 14 engine 16. The catalytic article 10 comprises an upstream catalytic zone 18 and at least one downstream catalytic zone 20. The upstream catalytic zone 18 comprises an upstream composition comprising a first upstream support, and at least one first upstream palladium component. Where there is a single upstream catalyst layer comprising palladium, it is preferred that the palladium containing composition has substantially no oxygen storage components. The downstream catalytic zone 20 comprises a first downstream layer 22 comprising a first downstream support, and a first downstream precious metal component. The downstream catalytic zone 20 further comprises a second downstream layer 24 comprising a second downstream support and a second downstream precious metal component. At least one of the first and second downstream layers comprises a palladium component.

In a preferred embodiment, the upstream catalytic zone 18 comprises a first upstream layer 26 and a second upstream layer 28. The first upstream layer 26 comprises a first upstream support, and at least one first upstream precious metal component. The second upstream layer 28 comprises a second upstream support and at least one second upstream precious metal component. At least one of the first and second upstream layers comprises a palladium component. The downstream catalytic zone 18 comprises first downstream layer 22 comprising the first downstream support and the first downstream precious metal component. Second downstream layer 24 comprises the second downstream support and the second downstream precious metal component. Preferably, at least one of the first and second downstream layers comprises a palladium component.

The catalytic article 10 can be located in canister 21. The catalytic article 10 is preferably located in the underfloor position upstream of muffler 23. Therefore, the present invention provides catalytic treatment of exhaust gases in the underfloor position during cool running periods such as during cold start operation.

The most preferred compositions in the upstream zone 18 containing a single layer is the composition described in Example 1 of commonly assigned U.S. Ser. No. 08/350,297, herein incorporated by reference. The most preferred compositions in the upstream zone 18 containing two layers is the composition described in Example 1 of commonly assigned U.S. Pat. No. 5,597,771, herein incorporated by reference. The most preferred compositions in the downstream zone 18 containing two layers is the composition described in Example 1 of commonly assigned U.S. Ser. No. 08/563,884, herein incorporated by reference. Following are detailed descriptions of the preferred compositions used in the upstream and downstream zones.

ONE LAYERED UPSTREAM CATALYST

A preferred upstream single layer catalyst composition of the present invention comprises a palladium component of the type used in a TWC catalyst composition and preferably there is substantially no oxygen storage components. For the purposes of the upstream single layer catalyst composition, components which have oxygen storage and release capabilities include cerium oxide and praseodymium oxide. Equivalent amount of other rare earths having less significant oxygen storage capability are not considered to be components which have substantial oxygen storage and release capability. Additionally, platinum group metal components are not considered to be oxygen storage components. In particular, the catalyst composition can be a three-way catalyst composition having substantially no ceria. Minor amounts of ceria or praseodymium may be present as impurities or trace amounts. Oxygen storage component such as cerium oxide store oxygen and release it during rich operating conditions providing additional oxygen to enable the oxidation of hydrocarbons and carbon monoxides to proceed more efficiently. The most preferred compositions in the upstream zone 18 containing a single layer are the compositions described in commonly assigned U.S. Ser. No. 08/350,297, herein incorporated by reference.

The present upstream single layer catalyst composition includes a palladium component, preferably at relatively high concentration. Accordingly, during cold start operation, a relatively high amount of hydrocarbons are oxidized, and a significant amount of carbon monoxide, although not all of the carbon monoxide is oxidized. Additionally, a significant amount of nitrogen oxides are reduced. In addition, the absence of oxygen storage component, particularly cerium compounds in the close-coupled catalyst limits the amount of carbon monoxide oxidation in the close-coupled catalyst even when the engine exhaust gases are hot and the downstream (underfloor) catalyst has reached operating temperatures. The carbon monoxide which does not react in the close-coupled catalyst passes to the downstream catalyst zone where it is catalytically oxidized, and such oxidation increases the temperature of the downstream catalyst resulting in a more effective operation. Accordingly, the upstream single layer catalyst composition of the present invention is sufficiently effective to eliminate a significant amount of pollutants at low temperatures while at the same time being stable over long periods of engine operation. The downstream catalyst zone can comprise at least two layer and can be of the same type described below.

The upstream single layer catalyst composition of the present invention is preferably substantially free of oxygen storage components such as ceria and praseodymia. The catalyst composition comprises a support which preferably comprises at least one compound selected from the group consisting of silica, alumina, titania and a first zirconia compound hereinafter referred to as a first zirconia compound. The composition further comprises a palladium component, preferably in an amount sufficient to oxidize carbon monoxide and hydrocarbons and reduce nitric oxides to have respective light-off temperatures at 50% conversion which are relatively low and preferably in the range of from 200 to 350° C. for the oxidation of hydrocarbons. The composition optionally comprises at least one alkaline metal oxide selected from the group consisting of strontium oxide, calcium oxide and barium oxide with strontium oxide most preferred. The composition can optionally also comprise other precious metal or platinum group metal components, preferably including at least one metal selected from the group consisting of platinum, rhodium, ruthenium and iridium components. Where additional platinum group metals are included, if platinum is used, it is used in an amount of less than 60 grams per cubic foot. Other platinum group metals are used in amounts of up to about 20 grams per cubic foot. The composition optionally also can include a second zirconium oxide compound as a stabilizer and optionally at lease one rare earth oxide selected from the group consisting of neodymium oxide and lanthanum oxide.

The upstream single layer catalyst composition preferably is in the form of a carrier supported catalyst where the carrier comprises a honeycomb type carrier. A preferred honeycomb type carrier comprises a composition having at least about 50 grams per cubic foot of palladium component, from 0.5 to 3.5 $g/in^3$ of activated alumina, and from 0.05 to 0.5$g/in^3$ of at least one alkaline earth metal component, most preferably, strontium oxide. Where lanthanum and/or neodymium oxide are present, they are present in amounts up to 0.6$g/in^3$.

TWO LAYERED UPSTREAM CATALYST

The present invention includes an embodiment where the upstream catalytic zone comprises a substrate and at least two layers. The catalyst structure is directed to a layered catalyst composite of the type useful as a three-way conversion catalyst or a TWC. The TWC catalyst composite of the present invention simultaneously catalyzes the oxidation of hydrocarbons and carbon monoxide and the reduction of nitrogen oxides in a gas stream. The most preferred compositions in the upstream zone 18 containing two layers are the composition described of commonly assigned U.S. Pat. No. 5,597,771, herein incorporated by reference.

The layered catalyst composite comprises a first upstream layer composition and the second layer comprises a second layer composition. As recited above, the gas stream initially encounters the second, top or outer layer composition which is designed to effectively reduce nitrogen oxides to nitrogen and oxidize hydrocarbons while causing oxidation of carbon monoxide. The gas then passes to the first layer to convert the rest of the pollutants.

The specific design of the top or second upstream layer results in effective reduction of nitrogen oxides and oxidation of hydrocarbons over wide temperature ranges. In the composite of the present invention, palladium, an economical platinum group metal, can be more effectively used by itself in such application. The performance of this material is further enhanced by the use of an alkaline earth metal which is believed to act as a stabilizer, a rare earth metal component selected from lanthanum and neodymium which is believed to act as a promoter, and a zirconium component.

In the first or bottom upstream layer, a first oxygen storage component is desired to be in intimate contact with the platinum group metal. In this first layer, oxidation and reduction reactions are efficient at temperatures above about 500° C.

The first upstream layer comprises a first platinum group metal component, which comprises a first palladium component, which can be the same or different than that in the second layer. For the first layer to result in higher temperature conversion efficiencies, an oxygen storage component is used in intimate contact with the platinum group metal. Here again, it is preferred to use an alkaline earth metal component believed to act as a stabilizer, a rare earth metal selected from lanthanum and neodymium metal components which is believed to act as a promoter, and a zirconium component.

A preferred catalyst of this invention comprises a palladium component present in each of the first and second upstream layers, in the catalytically-active, promoting component in an amount sufficient to provide compositions having significantly enhanced catalytic activity due to the palladium component. In a preferred embodiment the first palladium component is the only platinum group metal component in the first layer, and the second palladium component is the only platinum group metal component in the second layer. Optionally either or both of the first and second layers can further respectively comprise a first and second useful platinum group metals include, for instance, platinum, ruthenium, iridium and rhodium, and mixtures or alloys of such metals, e.g., platinum-rhodium.

In a preferred embodiment the first upstream layer can comprise a first palladium component and relatively minor amounts of a first platinum group metal other than palladium and/or the second layer can comprise a second palladium component and relatively minor amounts of a second platinum group metal component other than a palladium component. The preferred first and second platinum group components are selected from platinum, rhodium, and mixtures thereof. The preferred first platinum group metal component other than palladium is platinum and the most preferred second platinum group metal component other than palladium is selected from rhodium, platinum, and mixtures thereof. Typically, the first layer will contain up to 100 percent by weight of palladium as the platinum group metal. Where a first platinum group metal component other than palladium is used, it is used typically in amounts up to 40 and preferably from 0.1 to 40, more preferably from 5 to 25 percent by weight based on the total weight of the first palladium component and the platinum group metal components other than palladium in the first layer. Where a second platinum group metal component other palladium is used, it is used typically in amounts up to 40 and preferably from 0.1 to 40, more preferably from 5 to 25 percent by weight based on the total weight of the second palladium component and the platinum group metal components other than palladium in the second layer.

Thus, the present system preferably comprise at least two upstream layers wherein palladium is believed to principally act as a catalyst to enhance the lower temperature activity (reactions) in the second (top) layer, and the higher temperature activities (reactions) in the first (bottom) layer compared to the top layer. The top layer is therefore preferably designed to be reactive at temperatures below about 500° C., while the bottom layer is designed to be more reactive at temperatures above about 500° C. However, it is recognized that specific temperatures at which the layers are reactive and percent conversion depend on the specific exhaust gas environment including, for example, space velocity.

The first upstream layer composition and second upstream layer composition respectively comprise a first support and a second support which can be the same or different components. The support is made of a high surface area refractory oxide support. Useful high surface area supports include one or more refractory oxides. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 60 to 300 $m^2/g$.

The first upstream layer and second upstream layer compositions comprise alumina, catalytic components, stabilizers, reaction promoters and, if present, other modifiers and excludes the carrier or substrate. When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. For typical automotive exhaust gas catalytic converters, the catalyst composite which includes a monolithic substrate generally may comprise from about 0.50 to about 6.0, preferably about 1.0 to about 5.0 $g/in^3$ of catalytic composition coating.

In a preferred method of preparing the catalyst, a palladium and optionally a platinum group metal component other than palladium such as a suitable compound and/or complex of the palladium and platinum group metals may be utilized to achieve dispersion of the catalytic component on activated alumina support particles. As used herein, the term "palladium and optional platinum group metal component" means any palladium and optional platinum metal compound, complex, or the like which, upon calcination or use of the catalyst decomposes or otherwise converts to a catalytically active form, usually, the metal or the metal oxide. Water soluble compounds or water dispersible compounds or complexes of palladium may be utilized as long as the liquid used to impregnate or deposit the catalytic metal compounds onto alumina support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the palladium and optional platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, etc. During the calcination step, or at least during the initial phase of use of the catalyst, such compounds are converted into a catalytically active form of the platinum group metal or a compound thereof.

The catalyst of the present invention can contain a first upstream oxygen storage component in the first or bottom upstream layer which is in intimate contact with the palladium component. The oxygen storage component is any such material known in the art and preferably at least one oxide of a metal selected from the group consisting of rare earth metals and most preferably a cerium or praseodymium compound with the most preferred oxygen storage component being cerium oxide (ceria). The oxygen storage component can be present at least 5 wt. % and preferably at least 10 wt. % and more preferably at least 15 wt. % of the first layer composition. In the composition of the first or bottom upstream layer, the oxygen storage component can be included by dispersing methods known in the art. Such methods can include impregnation onto the first composition by impregnating the oxygen storage component onto the palladium containing support in the form of an aqueous solution, drying and calcining the resulted mixture in air to give a first layer which contains an oxide of the oxygen storage component in intimate contact with the palladium component. Typically, impregnation means that there is substantially sufficient liquid to fill the pores of the material being impregnated. Examples of water soluble or dispersible, decomposable oxygen storage components which can be used include, but are not limited to water soluble salts and/or colloidal dispersions of, cerium acetate, praseodymium acetate, cerium nitrate, praseodymium nitrate, etc. U.S. Pat. No. 4,189,404 discloses the impregnation of alumina-based support composition with cerium nitrate.

In the first or bottom upstream layer, there is optionally a first bulk oxygen storage composition comprising an oxygen storage component which is preferably ceria, and/or praseodymia in bulk form. Ceria is most preferred. By bulk form it is meant that the ceria and/or praseodymia is present as discrete particles which may be as small as 1 to 15 microns in diameter or smaller, as opposed to having been dispersed in solution as in the first layer. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria disposed within the alumina particles.

In addition to the above listed components of the first upstream layer composition and the second layer composition, it is optional that each layer contain a particular composite of zirconia and at least one rare earth oxide containing ceria. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

Both the first upstream layer composition and second upstream layer composition comprise a component which impart stabilization, preferably a first stabilizer in the first layer and second stabilizer in the second layer. The stabilizer is selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the first layer and second layer composition of the present invention use alkaline earth metal components. The alkaline earth metal components are preferably alkaline earth metal oxide. In a particularly preferred composition, it is desirable to use barium and strontium as the compound in the first and/or the second layer composition. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides.

One aspect of the present invention provides for applying one or more thermal stabilizers and/or catalytic promoter to a previously calcined coating of the activated alumina and catalytic components on a carrier substrate. In other aspects of the invention, one or more additive may be applied to the activated alumina either before or after the alumina particles are formed into an adherent, calcined coating on the carrier substrate. (As used herein, a "precursor", whether of a thermal stabilizer, or other modifier or other component, is a compound, complex or the like which, upon calcining or upon use of the catalyst, will decompose or otherwise be converted into, respectively, a thermal stabilizer, other modifier or other component.) The presence of one or more of the metal oxide thermal stabilizers tends to retard the phase transition of high surface area aluminas such as gamma and eta aluminas to alpha-alumina, which is a low surface area alumina. The retardation of such phase transformation tends to prevent or reduce the occlusion of the catalytic metal component by the alumina with the consequent decrease of catalytic activity.

In each of the first layer and second upstream layer compositions, the amount of metal oxide thermal stabilizer combined with the alumina may be from about 0.05 to 30 weight percent, preferably from about 0.1 to 25 weight percent, based on the total weight of the combined alumina, stabilizer and catalytic metal component.

Additionally, both the first upstream layer composition and the second layer composition contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

Both the first upstream layer composition and the second upstream layer composition contain at least one first promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia in the bottom layer, and neodymia or optionally lanthana in the top coat. While these compounds are known to act as stabilizers for the alumina support, their primary purpose in the composition of the present invention is to act as reaction promoters for the respective first and second layer compositions. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The first and second upstream layers preferably contain lanthanum and/or neodymium in the form of their oxides. However, these compounds are preferably initially provided in a soluble form such as an acetate, halide, nitrate, sulfate or the like to impregnate the solid components for conversion to oxides. It is preferred that in both the top coat and the bottom coat that the promoter be in intimate contact with the other components in the composition including and particularly the platinum group metal.

The first upstream layer composition and/or the second upstream layer composition of the present invention can contain other conventional additives such as sulfide suppressants, e.g., nickel or iron components. If nickel oxide is used, an amount from about 1 to 25% by weight of the first coat can be effective. As disclosed in U.S. Pat. No. 5,057,483 hereby incorporated by reference.

A particularly useful upstream layered catalyst composite of the present invention comprises in the first layer from about 0.003 to 0.3 g/in$^3$ of the first palladium component; from about 0 to 0.065 g/in$^3$ of the first platinum group metal component other than palladium; from about 0.15 to about 2.0 g./in$^3$ of the first support, i.e., alumina; at least about 0.05 g/in$^3$ of the total first oxygen storage component in intimate contact with the palladium component; from about 0.025 to about 0.5 g/in$^3$ of at least one first alkaline earth metal components; from about 0.025 to about 0.5 g/in$^3$ of the first zirconium component; from about 0.025 to about 0.5 g/in$^3$ of at least one first rare earth metal component selected from the group consisting of lanthanum metal components and neodymium metal components; and comprises in the second layer from about 0.003 to 0.3 g/in$^3$ of the second palladium component and from about 0 to 0.065 g/in$^3$ of a second rhodium component or a second platinum component or mixture thereof, from about 0.15 g/in$^3$ to about 2.0 g/in$^3$ of the second support, i.e., alumina; and from about 0.025 to about 0.5 g/in$^3$ of the second zirconium component. This first and/or second layers can further comprise from about 0.025 g/in$^3$ to about 0.5 g/in$^3$ of a nickel component. The first and/or second layers further can include the particulate composite of zirconia and ceria in amounts from 0.0 to 2.0 g/in$^3$ comprising 60 to 90 wt. % zirconia, 10 to 30 wt. % ceria and from 0 to 10 wt % rare earth oxides comprising lanthana, neodymia and mixtures thereof. Weight of the palladium component and other platinum group metal components are based on the weight of the metal.

The catalyst composite can be coated in layers on a monolithic substrate generally which can comprise from about 0.50 to about 6.0, preferably about 1.0 to about 5.0 g/in$^3$ of catalytic composition based on grams of composition per volume of the monolith.

The catalyst composite of the present invention can be made by any suitable method. A preferred method comprises mixing a first mixture of a solution of at least one water-soluble or dispersible, first palladium component and a finely-divided, high surface area, refractory oxide which is sufficiently dry to absorb essentially all of the solution. The first platinum group metal component other than palladium, when used, can be supported on the same or different refractory oxide particles as the palladium component.

The first supported palladium and other components are then added to water and preferably comminuted to form the first coat (layer) slurry. The first supported platinum group component other than palladium may be comminuted with the first support palladium component, or separately and combined with the other components to form the first coat slurry. Preferably, the slurry is acidic, having a pH of less than 7 and preferably from 3 to 7. The pH is preferably lowered by the addition of an acid, preferably acetic acid to the slurry. In particularly preferred embodiments the first coat slurry is comminuted to result in substantially all of the solids having particle sizes of less than 10 micrometers in average diameter. The first coat slurry can be formed into a first layer and dried. The first palladium component and optional platinum components other than palladium components in the resulting first mixture in the first layer are converted to a water insoluble form chemically or by calcining. The first layer is preferably calcined, preferably at least 250° C.

A second mixture of a solution of at least one water-soluble second palladium component and a finely-divided, high surface area, refractory oxide which is sufficiently dried to absorb essentially all of the solution is mixed. The second platinum group metal component, when used, may be supported on the same or different refractory oxide particles as the palladium component. Preferably, rhodium components are supported on different refractory oxide particles other than the palladium component. The supported second palladium component and other components are added to water and are preferably comminuted to form the second coat slurry. The supported second platinum group metal component other than palladium may be comminuted with the palladium component or separately and then combined with the supported palladium component and other components to form the second coat slurry. Preferably, the second slurry is acidic, having a pH of less than 7 and preferably from 3 to 7. The pH is preferably lowered by the addition of an acid, preferably nitric acid to the slurry. In particularly preferred embodiments the second coat slurry is comminuted to result in substantially all of the solids having particle sizes of less than 10 micrometers in average diameter. The second slurry can be formed into a second layer on the first layer and dried. The second palladium group component and optionally the second platinum group metal component other than palladium in the resulting second coat mixture can be converted to insoluble form chemically or by calcining. The second layer is preferably then calcined, preferably at least 250° C.

Alternatively, each upstream layer of the present composite can also be prepared by the method disclosed in U.S. Pat. No. 4,134,860 (incorporated by reference).

In order to deposit the first and second coat slurries on a macro sized carrier, one or more comminuted slurries are applied to the carrier in any desired manner. Thus the carrier may be dipped one or more times in the slurry, with intermediate drying if desired, until the appropriate amount of slurry is on the carrier. The slurry employed in depositing the catalytically-promoting metal component-high area support composite on the carrier will often contain about 20 to 60 weight percent of finely-divided solids, preferably about 25 to 55 weight percent.

The first upstream layer composition of the present invention and second layer composition of the present invention can be prepared and applied to a suitable substrate, preferably a metal or ceramic honeycomb carrier. The comminuted catalytically-promoting metal component-high surface area support composite can be deposited on the carrier in a desired amount, for example, the composite may comprise about 2 to 40 weight percent of the coated carrier, and is preferably about 5 to 30 weight percent for a typical ceramic honeycomb structure. The composite deposited on the carrier is generally formed as a coating over most, if not all, of the surfaces of the carrier contacted. The combined structure may be dried and calcined, preferably at a temperature of at least about 250° C. but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as corrugated sheet or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 3 to 8 weight percent of aluminum and up to about 20 weight percent of nickel, say at least about 1 weight percent of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, e.g. at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 1200 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based or nickel based corrosion resistant alloys.

Such monolithic carriers may contain up to about 700 or more flow channels ("cells") per square inch of cross section, although far fewer may be used. For example, the carrier may have from about 60 to 600, more usually from about 200 to 400, cells per square inch ("cpsi").

The discrete form and second coats of catalytic material, conventionally referred to as "washcoats", are coated onto a suitable carrier with, preferably, the first coat adhered to the carrier and the second coat overlying and adhering to the first coat. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided on an upstream (as sensed in the direction of gas flow through the catalyst composition) portion of the carrier, with the first coat provided on a downstream portion of the carrier. Thus, to apply the washcoat in this configuration, an upstream longitudinal segment only of the carrier would be dipped into a slurry of the second coat catalytic material, and dried, and the undipped downstream longitudinal segment of the carrier would then be dipped into a slurry of the first coat catalytic material and dried. Alternatively, separate upstream carriers may be used, one carrier on which the first upstream coat is deposited and a second carrier on which the second upstream coat is deposited, and then the two separate carriers may be positioned within a canister or other holding device and arranged so that the exhaust gas to be treated is flowed in series first through the catalyst containing the second coat and then through the catalyst containing the first coat thereon. However, as indicated above, it is preferred to utilize a catalyst composition in which the second coat overlies and adheres to the first coat because such configuration is believed both to simplify production of the catalyst composition and to enhance its efficacy.

TWO LAYERED DOWNSTREAM CATALYST

The present invention includes an embodiment where the downstream catalytic zone comprises a substrate and at least two layers. The catalyst structure is directed to a layered catalyst composite of the type useful as a three-way conversion catalyst or a TWC. The TWC catalyst composite of the present invention simultaneously catalyzes the oxidation of hydrocarbons and carbon monoxide and the reduction of nitrogen oxides in a gas stream. The most preferred compositions in the downstream zone 18 containing two layers are the composition described of commonly assigned U.S. Ser. No. 08/563,884, herein incorporated by reference.

The layered catalyst composite comprises a first downstream layer comprising a first downstream layer composition and the second layer comprising a second layer composition. As recited above, the gas stream initially encounters the second, top or outer downstream layer composition which is designed to effectively reduce nitrogen oxides to nitrogen and oxidize hydrocarbons while causing some oxidation of carbon monoxide. The gas then passes to the first downstream layer to convert the rest of the pollutants.

The layered catalyst composite comprises a first downstream layer comprising a first layer composition and the second downstream layer comprising a second layer composition. The first downstream layer is also referred to as the bottom or inner layer, and the second downstream layer is also referred to as to top or outer layer.

As recited, the gas stream initially encounters the second downstream composition which is designed to effectively reduce nitrogen oxides to nitrogen and oxidize hydrocarbons while causing some oxidation of carbon monoxide. The gas then passes to the first downstream layer designed to convert pollutants, including the oxidation of hydrocarbons and remaining carbon monoxide.

The specific design of the first downstream layer results in effective oxidation of hydrocarbons over wide temperature ranges for long periods of time. In the preferred composite the first downstream layer comprises a catalytically effective amount of palladium component. Optionally, there can be minor amounts of platinum, 0 to 50, i.e., from 0 up to 50, preferably 0 to 20 and most preferably 0 to 10 percent by weight of platinum metal based on the total platinum component used in the first and second layer. Where platinum is used, typical minimum amounts are from about 1, preferably 3 and most preferably 5 percent by weight of platinum component based on platinum metal in the first and second layers. The performance of the first layer platinum group precious metal component can be enhanced by the use of a stabilizer, preferably alkaline earth metals, promoters preferably selected from lanthanum and neodymium, and a zirconium component. An oxygen storage component is preferably also included. The oxygen storage component can be in any form, including bulk form, part of a first oxygen storage composition, in or impregnated as a solution where there can be intimate contact between the oxygen storage component and the first layer platinum group metal components. The oxygen storage component enhances oxidation in the bottom layer. Intimate contact occurs when the oxygen storage component is introduced in the form of a solution of a soluble salt which impregnates the support and other particulate material and then can be converted to an oxide form upon calcining.

The second downstream layer comprises a second platinum component and a rhodium component. The second or top downstream layer contains from 50 to 100 weight percent of the platinum component based on the total platinum metal in the first and second layers. For the second downstream layer to result in higher temperature conversion efficiencies, an oxygen storage composition comprising a diluted oxygen storage component is used. A preferred oxygen storage composition is a composite comprising ceria and zirconia. This results in the second oxygen storage component having minimum intimate contact with the platinum group metal components (i.e., the rhodium and platinum components) even where the platinum group metal components are supported on the bulk oxygen storage composition particles. It is preferred to include a second zirconium component in the second layer.

The first downstream layer composition and second downstream layer composition respectively comprise a first support and a second support which can be the same or different support components. The support preferably comprises a high surface area refractory oxide support. Useful high surface area supports include one or more refractory oxides. These oxides include, for example, silica and alumina, include mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or transitional alumina, such as gamma and eta aluminas, and, if present, a minor amount of other refractory oxide, e.g., about up to 20 weight percent. Desirably, the active alumina has a specific surface area of 60 to 300 $m^2/g$.

The preferred catalyst of this invention comprises platinum group metal components present in an amount sufficient to provide compositions having significantly enhanced catalytic activity to oxidize hydrocarbons and carbon monoxide and reduce nitrogen oxides. The location of the platinum group metal components, particularly the rhodium component and palladium component and the relative amounts of platinum components in the respective first and second layers have been found to affect the durability of catalyst activity. Additionally, the use of the dilute second oxygen storage component that does not intimately contact the majority of the platinum component and rhodium components also contributes to enhanced long term catalyst activity.

In preparing the catalyst, a platinum group metal catalytic component such as a suitable compound and/or complex of any of the platinum group metals may be utilized to achieve dispersion of the catalytic component on the support, preferably activated alumina support particles. As used herein, the term "platinum group metal component" includes the recited platinum, rhodium and platinum components and means any such platinum group metal compound, complex, or the like which, upon calcination or use of the catalyst decomposes or otherwise converts to a catalytically active form, usually, the metal or the metal oxide. Water soluble compounds or water dispersible compounds or complexes of one or more platinum group metal components may be utilized as long as the liquid used to impregnate or deposit the catalytic metal compounds onto the alumina support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine solubilized platinum hydroxide such as hexahydroxymonoethanolamine complexes of platinum, rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof, typically an oxide.

The catalyst of the present invention can contain a first downstream oxygen storage component in the first layer which can be in bulk form or in intimate contact with the platinum group metal component, i.e., palladium. The oxygen storage component is any such material known in the art and preferably at least one oxide of a metal selected from the group consisting of rare earth metals, most preferably a cerium, praseodymium or a neodymium compound with the most preferred oxygen storage component being cerium oxide (ceria).

In the composition of the first downstream layer, the oxygen storage component can be included by dispersing methods known in the art. Such methods can include impregnation onto the first support composition. The oxygen storage component can be in the form of an aqueous solution. Drying and calcining the resulted mixture in air results in a first layer which contains an oxide of the oxygen storage component in intimate contact with the platinum group metal component. Typically, impregnation means that there is substantially sufficient liquid to fill the pores of the material being impregnated. Examples of water soluble, decomposable oxygen storage components which can be used include, but are not limited to, cerium acetate, praseodymium acetate, cerium nitrate, praseodymium nitrate, etc. U.S. Pat. No. 4,189,404 discloses the impregnation of alumina based support composition with cerium nitrate.

In the second downstream layer, there is optionally and preferably a second oxygen storage composition which is in bulk form. The second oxygen storage composition comprises a second oxygen storage component which is preferably a cerium group component preferably ceria, praseodymia and/or neodymia, and most preferably ceria. By bulk form it is meant that the composition comprising ceria and/or praseodymia is present as discrete particles which may be as small as 0.1 to 15 microns in diameter or smaller, as opposed to having been dispersed in solution as in the first layer. A description and the use of such bulk components is presented in U.S. Pat. No. 4,714,694, hereby incorporated by reference. As noted in U.S. Pat. No. 4,727,052, also incorporated by reference, bulk form includes oxygen storage composition particles of ceria admixed with particles of zirconia, or zirconia activated alumina. It is particularly preferred to dilute the oxygen storage component as part of an oxygen storage component composition.

The oxygen storage component composition used in the second downstream layer as well as the first downstream layer can comprise an oxygen storage component, preferably ceria and a diluent component. The diluent component can be any suitable filler which is inert to interaction with platinum group metal components so as not to adversely affect the catalytic activity of such components. A useful diluent material is a refractory oxide with preferred refractory oxides being of the same type of materials recited below for use as catalyst supports. Most preferred is a zirconium compound with zirconia most preferred. Therefore, a preferred oxygen storage component is a ceria-zirconia composite. There can be from 1 to 99, preferably 1 to 50, more preferably 5 to 30 and most preferably 10 to 25 weight percent ceria based on the ceria and zirconia. A preferred oxygen storage composition for use in the second layer composition, and optionally the first layer composition, can comprise a composite comprising zirconia, ceria and at least one rare earth oxide. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

The first downstream layer composition optionally and preferably comprises a component which imparts stabilization. The stabilizer can be selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the first layer composition of the present invention preferably use alkaline earth metal components. The alkaline earth metal components are preferably alkaline earth metal oxides. In particularly preferred compositions, it is desirable to use barium oxide and/or strontium oxide as the compound in the first layer composition. The alkaline earth metal can be applied in a soluble form which upon calcining becomes the oxide. It is preferred that the soluble barium be provided as barium nitrite or barium hydroxide and the soluble strontium provided as strontium nitrate or acetate, all of which upon calcining become the oxides.

One aspect of the present invention provides for applying one or more thermal stabilizers to a previously calcined coating of the activated alumina and catalytic components on a carrier substrate. In other aspects of the invention, one or more modifiers may be applied to the activated alumina either before or after the alumina particles are formed into an adherent, calcined coating on the carrier substrate. (As used herein, a "precursor", whether of a thermal stabilizer, or other modifier or other component, is a compound, complex or the like which, upon calcining or upon use of the catalyst, will decompose or otherwise be converted into, respectively, a thermal stabilizer, other modifier or other component.) The presence of one or more of the metal oxide thermal stabilizers typically tends to retard the phase transition of high surface area aluminas such as gamma and eta aluminas to alpha-alumina, which is a low surface area alumina. The retardation of such phase transformations tend to prevent or reduce the occlusion of the catalytic metal component by the alumina with the consequent decrease of catalytic activity.

In the first downstream layer composition, the amount of thermal stabilizer combined with the alumina may be from about 0.05 to 30 weight percent, preferably from about 0.1 to 25 weight percent, based on the total weight of the combined alumina, stabilizer and catalytic metal component.

Both the first downstream layer composition and the second downstream layer composition can contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

The first downstream layer composition preferably contains at least one first promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia in the bottom layer, and neodymia or optionally lanthana in the top coat. While these compounds are disclosed to act as stabilizers, they can also act as reaction promoters. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The first downstream layer preferably contains lanthanum and neodymia and/or neodymium in the form of their oxides. Preferably, these compounds are initially provided in a soluble form such as an acetate, halide, nitrate, sulfate or the like to impregnate the solid components for conversion to oxides. It is preferred that in the first layer, the promoter be in intimate contact with the other components in the composition including and particularly the platinum group metal.

The first downstream layer composition and/or the second downstream layer composition of the present invention can contain other conventional additives such as sulfide suppressants, e.g., nickel or iron components. If nickel oxide is used, an amount from about 1 to 25% by weight of the first coat can be effective, as disclosed in commonly owned serial number 07/787,192, hereby incorporated by reference.

A particularly useful downstream layered catalyst composite of the present invention comprises in the first layer from about 0.025 to 0.10 g/in$^3$ of the palladium component; from about 0 to 0.01 g/in$^3$ of the first platinum component; from about 0.15 to about 1.5 g./in$^3$ of the first support, i.e., alumina; at least about 0.05 g/in$^3$ of the first oxygen storage component; from about 0.025 to about 0.5 g/in$^3$ of at least one first alkaline earth metal components; from about 0.025 to about 0.5 g/in$^3$ of the first zirconium component; from about 0.0 to about 0.5 g/in$^3$ of at least one first rare earth metal component selected from the group consisting of lanthanum metal components and neodymium metal components; and comprises in the second layer from about 0.001 to 0.02 g/in$^3$ of the second platinum component and from about 0.001 to 0.01 g/in$^3$ of the rhodium component from about 0.15 g/in$^3$ to about 1.0 g/in$^3$ of the second support, i.e., alumina; from about 0.1 g/in$^3$ to about 1.5 g/in$^3$ of a second oxygen storage composite which comprises a particulate composite of zirconia and ceria; and from about 0.025 to about 0.5 g/in$^3$ of the second zirconium component. This first and/or second layers can further comprise from about 0.025 g/in$^3$ to about 0.5 g/in$^3$ of a nickel component. The particulate composite of zirconia and ceria can comprise 60 to 90 wt. % zirconia, 10 to 30 wt. % ceria and from 0 to 10 wt % rare earth oxides comprising lanthana, neodymia and mixtures thereof.

The downstream catalyst composite can be coated in layers on a monolithic substrate generally which can comprise from about 0.50 to about 6.0, preferably about 1.0 to about 5.0 g/in$^3$ of catalytic composition based on grams of composition per volume of the monolith. The catalyst composite of the present invention can be made by any suitable method. A preferred method comprises mixing a first mixture of a solution of at least one water-soluble, first palladium component and optionally a first platinum component, and finely-divided, high surface area, refractory oxide which is sufficiently dry to absorb essentially all of the solution.

The first downstream platinum and platinum component are added to water to form a first slurry and preferably comminuted in the first slurry. Preferably, the slurry is acidic, having a pH of less than 7 and preferably from 3 to 7. The pH is preferably lowered by the addition of an acid, preferably acetic acid to the slurry. In particularly preferred embodiments the first slurry is comminuted to result in substantially all of the solids having particle sizes of less than 10 micrometers in average diameter. The first slurry can be formed into a first layer and dried. The first palladium component and optional platinum component in the resulting first mixture in the first layer are converted to a water insoluble form. The palladium and platinum components can be converted to insoluble form chemically or by calcining. The first layer is preferably calcined, preferably at least 250° C.

A second mixture of a solution of at least one water-soluble second platinum component and at least one water-soluble rhodium component, and finely-divided, high surface area, refractory oxide which is sufficiently dried to absorb essentially all of the solution is mixed. The second platinum component and second rhodium component are added to water to form a second slurry and preferably comminuted in the second slurry. Preferably, the second slurry is acidic, having a pH of less than 7 and preferably from 3 to 7. The pH is preferably lowered by the addition of an acid, preferably acidic acid to the slurry. In particularly preferred embodiments the second slurry is comminuted to result in substantially all of the solids having particle sizes of less than 10 micrometers in average diameter. The second slurry can be formed into a second layer on the first layer and dried. The second platinum group component and second rhodium component in the resulting second mixture are converted to a water insoluble form. The platinum and rhodium components can be converted to insoluble form chemically or by calcining. The second layer is preferably then calcined, preferably at least 250° C.

Each downstream layer of the present composite can also be prepared by the method in disclosed in U.S. Pat. No. 4,134,860 (incorporated by reference) generally recited as follows.

A finely-divided, high surface area, refractory oxide support is contacted with a solution of a water-soluble, catalytically-promoting metal component, preferably containing one or more platinum group metal components, to provide a mixture which is essentially devoid of free or unabsorbed liquid. The catalytically-promoting platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the catalytically-promoting metal component, i.e., the amounts of the solution and the support, as well as the moisture content of the latter, are such that their mixture has an essential absence of free or unabsorbed solution when the addition of the catalytically-promoting metal component is complete. During the latter conversion or fixing of the catalytically-promoting metal component on the support, the composite remains essentially dry, i.e. it has substantially no separate or free liquid phase.

The mixture containing the fixed, catalytically-promoting metal component can be comminuted as a slurry which is preferably acidic, to provide solid particles that are advantageously primarily of a size of up to about 5 to 15 microns. The resulting slurry is preferably used to coat a macro size carrier, preferably having a low surface area, and the composite is dried and may be calcined. In these catalysts the composite of the catalytically-promoting metal component and high area support exhibits strong adherence to the carrier, even when the latter is essentially non-porous as may be the case with, for example, metallic carriers, and the catalysts have very good catalytic activity and life when employed under strenuous reaction conditions. Each of the first and second layers can be succeedingly applied and calcined to form the composite of the present invention.

The method provides compositions of uniform and certain catalytically-promoting metal content since essentially all of the platinum group metal component thereby added to the preparation system remains in the catalyst, and the compositions contain essentially the calculated amount of the single or plural active catalytically-promoting metal components. In some instances a plurality of catalytically-active metal components may be deposited simultaneously or sequentially on a given refractory oxide support. The intimate mixing of separately prepared catalytically-promoting metal component refractory oxide composites of different composition made by the procedure of this invention, enables the manufacture of a variety of catalyst whose metal content may be closely controlled and selected for particular catalytic effects. Such mixed composites may, if desired, contain one or more catalytically- promoting metal components on a portion of the refractory oxide support particles, and one or more different catalytically-promoting metal components on another portion of the refractory oxide support particles. For example, the composite may have a platinum group metal component on a portion of the refractory oxide particles, and a base metal component on a different portion of the refractory oxide particles. Alternatively, different platinum group metals or different base metals may be deposited on separate portions of the refractory oxide support particles in a given composite. It is, therefore, apparent that this process is highly advantageous in that it provides catalysts which can be readily varied and closely controlled in composition.

Precious metal group or base metal group components, alone or in mixtures, may be formed in separate first and second layers on a high surface area refractory oxide which can be subsequently deposited on a macro size carrier. This provides the maximum availability of platinum metal components which are present in small quantities by depositing them on the outer surface of the carrier. The latter method permits deposition of substantially discrete layers of various metal components on high surface area refractory oxides in order to obtain maximum use of expensive catalytic components or to achieve certain catalytic advantages, such as, an inlet portion being coated with components to give light-off or reaction-starting activity at relatively low temperatures. If the metal components are not selectively deposited on the carrier and fixed to the refractory oxide, they may move freely from one layer of the catalyst to the next.

In accordance with this method the mixture of the catalytically-promoting metal component and refractory oxide support can be prepared by mixing an aqueous solution containing a water-soluble form of the catalytically-promoting metal with a finely-divided, high surface area support to essentially completely absorb the solution in the support. The solution may contain one or more water-soluble compounds of a precious metal or a base metal. Water-soluble platinum group metal components are preferred to be in the form of a basic compound such as a platinum hydroxide or tetramine complex, or an acidic compound such as chloroplatinic acid or rhodium nitrate. The useful base metal compounds include the water-soluble salts such as the nitrates, formates, other oxygen-containing compounds and the like. The separate compounds of the catalytically-promoting metals may be added to the support in one or more aqueous solutions to provide two or more metals on given support particles.

After the catalytically-promoting metal solution and high area refractory oxide support are combined the catalytically-promoting metal component can be fixed on the support, i.e., converted to essentially water-insoluble form, while the composite remains essentially devoid of free or unabsorbed aqueous medium. The conversion may be effected chemically, by treatment with a gas such as hydrogen sulfide or hydrogen or with a liquid such as acetic acid or other agents which may be in liquid form, especially an aqueous solution, e.g. hydrazine. The amount of liquid used, however, is not sufficient for the composite to contain any significant or substantial amount of free or unabsorbed liquid during the fixing of the catalytically-promoting metal on the support. The fixing treatment may be with a reactive gas or one which is essentially inert; for example, the fixing may be accomplished by calcining the composite in air or other gas which may be reactive with the catalytically-promoting metal component or essentially inert. The resulting insoluble or fixed catalytically-promoting metal component may be present as a sulfide, oxide, elemental metal or in other forms. When a plurality of catalytically-promoting metal components are deposited on a support, fixing may be employed after each metal component deposition or after deposition of a plurality of such metal components.

The particle size of the finely-divided, high surface area, refractory oxide support is generally above about 10 or 15 micrometers. As noted above, when combined with the catalytically-promoting metal-containing solution the high area support is sufficiently dry to absorb essentially all of the solution.

In making catalysts by this invention, the catalytically-active composite of the fixed or water-insoluble catalytically-promoting metal component and high area support can be combined with a macro size carrier, preferably of low total surface area. This can be accomplished by first comminuting the catalytically-active composite or plurality of such composites, as an aqueous slurry which is preferably acidic. This treatment is usually continued until the solid particles in the slurry have particle sizes which are mostly below about 10 or 15 micrometers. The comminution can be accomplished in a ball mill or other suitable equipment, and the solids content of the slurry my be, for instance, about 20 to 50 weight percent, preferably about 35 to 45 weight percent. The pH of the slurry is preferably below about 5 and acidity may be supplied by the use of a minor amount of a water-soluble organic or inorganic acid or other water-soluble acidic compounds. Thus the acid employed may be hydrochloric or nitric acid, or more preferably a lower fatty acid such as acetic acid, which may be substituted with, for example, chlorine as in the case of trichloroacetic acid. The use of fatty acids may serve to minimize any loss of platinum group metal from the support.

In order to deposit the catalytically-promoting group metal-support composite on the macro sized carrier, one or more comminuted slurries are combined separately or together with the carrier in any desired manner. Thus the carrier may be dipped one or more times in the slurry, with intermediate drying if desired, until the appropriate amount of slurry is on the carrier. The slurry employed in depositing the catalytically-promoting metal component-high area support composite on the carrier will often contain about 20 to 50 weight percent of finely-divided solids, preferably about 35 to 45 weight percent.

The downstream layered catalyst composite can be used in the form of a self-supporting structure such as a pellet or on a suitable carrier or substrate, such as a metallic or ceramic honeycomb.

The first downstream layer composition of the present invention and second downstream layer composition of the present invention can be prepared and formed into pellets by known means or applied to a suitable substrate, preferably a metal or ceramic honeycomb carrier. The comminuted catalytically-promoting metal component-high surface area support composite can be deposited on the carrier in a desired amount, for example, the composite may comprise about 2 to 30 weight percent of the coated carrier, and is preferably about 5 to 20 weight percent. The composite deposited on the carrier is generally formed as a coating over most, if not all, of the surfaces of the carrier contacted. The combined structure may be dried and calcined, preferably at a temperature of at least about 250° C. but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as pellets or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 3 to 8 weight percent of aluminum and up to about 20 weight percent of nickel, say at least about 1 weight percent of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite,, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such metal monolithic carriers may contain up to about 1200 or more flow channels ("cells") per square inch of cross section, although far fewer may be used. For example, the carrier may have from about 60 to 1200, more usually from 200 to 800, and most usually about 400 to 600, cells per square inch ("cpsi").

In an alternate embodiment, the downstream zone 20 is designed to have a greater thermal mass than the upstream zone 18. For the purpose of the present invention, thermal mass is defined as the mass of the upstream or downstream zone times the heat capacity of the respective zone. This design is particularly preferred when combined with the catalytic composition as recited above for use in the respective zones. Where upstream and downstream honeycomb monoliths are made of the same or similar materials, useful upstream monolith have ranges axial length of the honeycomb 30 from 0.5 to 3.0, 0.5 to 2.5, 0.5 to 2.0, 1.0 to 2.0 and 1.0 to 3.0 inches long. Preferred ceramic upstream honeycomb monoliths have a length of from 2.0 to 3.0 inches long, with monoliths of 2.5 inches long being commercially available. A significant factor affecting the thermal mass of the upstream and downstream zones is the material the substrate is made from. A useful embodiment comprises an upstream honeycomb made of metal and a downstream monolith made of ceramic. The ceramic honeycombs tend to have greater heat capacities. Other parameters affecting the thermal mass are the number of cells per square inch (cpsi), catalyst loading and honeycomb wall thicknesses which vary from 0.001 to 0.014 inches. Ceramic monoliths typically have wall thicknesses ranging from 0.002 to 0.008 inches, which metal monoliths typically have wall thicknesses ranging from 0.0015 to 0.003 inches. Useful honeycomb flowthrough monoliths have from 300 to 600 cpsi. Depending on wall thickness, etc. a higher cpsi monolith has a higher thermal mass. The present invention can use an upstream monolith having a lower cpsi in the monolith than the downstream monolith. The smaller upstream monolith will thereby heat up faster. Useful and preferred honeycombs can be made from ceramic materials or metallic materials as recited above. The preferred upstream ceramic honeycomb is made of cordierite, has from 300 to 600 cpsi and is from 2.0 to 3.0 inches in the axial direction. The preferred downstream ceramic honeycomb is made of cordierite, has from 300 to 600 cpsi and is from greater than 3.0 to about 9.0 inches in the axial direction. The upstream and downstream honeycombs act as substrates to support the catalyst compositions of the upstream zone and downstream zone as described above.

Preferably, the composition of the smaller upstream zone is designed to have a lower light-off temperature than the downstream zone. Thereby, the upstream zone heats up and catalyzes the reaction sooner. It is also designed to operate during conditions, such as during idle, when residence time may be longer, and space velocities may be lower than during steady state operation. For the purpose of the present invention the term "light-off" shall mean the temperature at which the catalyst becomes active and can initiate the reaction of the exhaust gas components. Stated another way the residence time is indicated by the reciprocal of the space velocity. For the purpose of the present invention the term "space velocity" shall mean volume of gas that passes through the catalytic monolith in a given time period divided by the total volume of the catalytic monolith and is measured in reciprocal time units such as reciprocal hours. The catalytic article of the present invention can advantageously be used at space velocities ranging from 10 to 500,000 and more typically from 50 to 350,000 reciprocal hours.

The catalytic compositions made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 150° C., preferably about 200° to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. An advantage of the present invention is that the catalytic article of the present invention can be used in the "underfloor" position of motor vehicles as illustrated in FIG. 2. Many such reaction systems are known in the art.

The present invention is illustrated further by the following examples which are not intended to limit the scope of this invention.

EXAMPLE 1

An approximately two and one-half inch long cordierite monolith with a cell density of 400 cpsi and cross sectional area of about 15.5 in$^2$ was impregnated with a high surface area alumina washcoat containing palladium at a concentration of 200 g/ft$^3$. This washcoat differs with the conventional washcoat in its formulation which includes stabilizers and promoters. The upstream catalyst coating comprises two layers of the same composition as recited in Example 1 of U.S. Pat. No. 5,597,771 herein incorporated by reference. Since the precious metal is impregnated into the washcoat powder prior to formation of the coating slurry, this process differs from the conventional process in which the precious metal is added on after the monolith has been coated with washcoat. Additionally, this washcoat contains cerium-stabilized zirconium, and is applied onto the cordierite monolith as a layered coating. For example, a loading of 1.9 g/in$^3$ is coated on the monolith as a first layer (bottom coat) and 1.3 g/in$^3$ loading as the second layer (top coat). The second honeycomb is about 6 inches long with the same cross sectional area. This downstream catalyst coating comprises two layers of the same composition as recited in Example 1 of U.S. Ser. No. 08/563,884 herein incorporated by reference. This catalyst consists of layered washcoat, with Pd/Pt on the bottom coat and Pt/Rh on the top coat. The total precious metal loading is 105 g/ft$^3$ with a ratio of Pt/Pd/Rh=1/14/1. The washcoat loading is 2 g/in$^3$ for the bottom coat and 1.8 g/in$^3$ for the top coat.

Both bricks were installed into a single canister with a total monolith volume about 132 in$^3$. The Pd-only brick is located at the upstream of the canister with a 0.5" space between the two bricks. This canister was subjected to engine aging for 50 hours at an inlet gas temperature of 800° C. After aging, the canister was installed into a Honda Civic 2.2 L vehicle, at an underfloor position, for Bag2 FTP-75 evaluation. Results are listed below:

| Catalyst System | Conversions, % | | |
| --- | --- | --- | --- |
| | HC | CO | NOx |
| Pd-Only + Pt/Pd/Rh | 99.50 | 96.90 | 98.50 |

EXAMPLE 2

The front brick, at a size of 26.3in$^3$ (3.66" diameter×2.5" long), is coated with a washcoat the same as that as recited in Example 1 of U.S. Ser. No. 08/350,297, with Pd loading of 200 g/ft$^3$, and total washcoat loading of 1.9 g/in$^3$. The rear brick, sized at about 47 in$^3$ (3.66" diameter×4.5" long), is impregnated with the same washcoat slurries as used in Example 1 for the second brick. Both bricks were aged as in Example 1. The inlet temperature, however, was 820° C. and the aging time was 100 hours, instead of 800° C. and 50 hours shown in Example 1. This catalyst system was evaluated using the same Honda Civic 2.2 L as that in Example 1. Results are shown below:

| Catalyst System | Conversions, % Conversion, % | | |
| --- | --- | --- | --- |
| | HC | CO | NOx |
| Pd-Only + Pt/Pd/Rh | 98.90 | 95.90 | 98.50 |

The Pd-only at the front, and bi-metal or tri-metal catalyst at the rear arrangement, creates advantages over a system consisting of Pd-only catalysts, as illustrated below:

| Catalyst System | Conversions, % Conversion, % | | |
| --- | --- | --- | --- |
| | HC | CO | NOx |
| Pd-Only + Pt/Pd/Rh | 98.90 | 95.90 | 98.50 |
| Pd-Only + Pd-Only | 99.00 | 93.70 | 97.90 |

While the bricks for both systems are the same in size, the catalyst composition is the same only for the front bricks. The difference lies in the rear bricks. The rear brick for the Pd-only system consists of a catalyst having the same composition as the one serving as the front brick of the system in Example 1, except that the Pd loading has been reduced from 200 g/ft$^3$ to 100 g/ft$^3$.

What is claimed is:

1. An exhaust gas treatment catalytic article comprising: an upstream catalytic zone and at least one downstream catalytic zone, the upstream catalytic zone comprising:
   an upstream composition comprising;
      a first upstream support, and
      at least one first upstream palladium component, there being a sufficient amount of the upstream palladium component to result in a 50 percent conversion at 200° C. to 350° C. for the oxidation of hydrocarbons, and
   wherein the upstream composition has substantially no oxygen storage components; and
   the downstream catalytic zone comprising:
      a first downstream layer comprising;
      a first downstream support,
      a first downstream precious metal component,
   a second downstream layer comprising;
      a second downstream support,
      a second downstream precious metal component,
      wherein at least one of the first and second downstream layers comprises a palladium component; and
      wherein the upstream composition has a lower light-off temperature than the downstream composition.

2. The article of claim 1 wherein the downstream catalytic zone comprises at least one additional precious metal selected from the group consisting of:
   a first downstream platinum component in the first layer, a first downstream rhodium component in the first layer,
a second downstream platinum component in the second layer, and
a second downstream rhodium component in the second layer.

3. The article of claim 1 further comprising:
a first downstream palladium component in the first layer,
optionally a first downstream platinum component in the first layer, and
optionally a first downstream rhodium component in the first layer.

4. The article of claim 3 further comprising:
a second downstream platinum component in the second layer, and
a second downstream rhodium component in the second layer.

5. The article of claim 1 wherein the downstream zone has a greater thermal mass than the upstream zone.

6. An exhaust gas treatment catalytic article comprising:
an upstream catalytic zone and at least one downstream catalytic zone, the upstream catalytic zone comprising:
a first upstream layer and a second upstream layer,
the first upstream layer comprising;
a first upstream support, and
at least one first upstream palladium component,
the second upstream layer comprising;
a second upstream support,
at least one second upstream palladium component; and
the downstream catalytic zone comprising:
a first downstream layer comprising;
a first downstream support,
a first downstream precious metal component,
a second downstream layer comprising;
a second downstream support,
a second downstream precious metal component,
wherein one of the first and second downstream layers comprises a palladium component and the other layer comprises a rhodium component.

7. The article of claim 6 further comprising:
a first upstream oxygen storage component in the first upstream layer, and
optionally a second upstream oxygen storage component in the second upstream layer.

8. The article of claim 7 wherein the downstream catalytic zone comprises at least one additional precious metal selected from the group consisting of:
a first downstream platinum component in the first layer,
a first downstream rhodium downstream component in the first layer,
a second downstream platinum component in the second layer, and
a second downstream rhodium downstream component in the second layer.

9. The article of claim 7 further comprising:
a first downstream palladium component in the first layer,
optionally a first downstream platinum component in the first layer, and
optionally a first downstream rhodium component in the first layer.

10. The article of claim 9 further comprising:
a second downstream platinum component in the second layer, and
a second downstream rhodium component in the second layer.

11. The article of claim 7 wherein the second downstream layer further comprises at least one first downstream stabilizer.

12. The article of claim 7 wherein the second downstream layer further comprises at least one first downstream rare earth metal component.

13. The article of claim 7 wherein the second downstream layer further comprises a first downstream zirconium compound.

14. The article of claim 7 wherein the second downstream layer further comprises a second oxygen storage composition comprising a diluted second oxygen storage component.

15. The article of claim 13 wherein the second downstream layer further comprises a second downstream zirconium component.

16. The article as recited in claim 6 wherein
the first upstream layer further comprises:
optionally at least one first upstream stabilizer;
optionally at least one first upstream rare earth metal component; and
optionally a first upstream zirconium compound; and
the second upstream layer further comprises:
at least one second upstream platinum group metal component selected from an upstream rhodium component and
a platinum component; and
optionally a second upstream zirconium component.

17. The article as recited in claim 6 wherein
the first upstream layer further comprises:
optionally at least one first upstream stabilizer;
optionally at least one first upstream rare earth metal component; and
optionally an upstream zirconium compound; and
the second upstream layer further comprises:
optionally a second upstream oxygen storage composition comprising a diluted second oxygen storage component; and
optionally a zirconium component;
the first downstream layer further comprises:
a first downstream palladium component;
optionally an additional first downstream platinum group component;
optionally at least one first downstream stabilizer;
optionally at least one first downstream rare earth metal component; and
optionally a first downstream zirconium compound; and
the second downstream layer further comprises:
a downstream platinum component;
a rhodium downstream component;
optionally a downstream oxygen storage composition comprising a diluted oxygen storage component; and
optionally a downstream zirconium compound.

18. The article as recited in claims 1, 6 or 16 wherein the first and second upstream and downstream supports are the same or different and are compounds selected from the group consisting of silica, alumina and titania compounds.

19. The article as recited in claim 18 wherein the first and second supports are the same or different and are activated compounds selected from the group consisting of alumina, silica, silica-alumina, alumino-silicates, alumina-zirconia, alumina-chromia, and alumina-ceria.

20. The article as recited in claim 19 wherein the first and second supports are activated alumina.

21. The article as recited in claims 1, 6 or 16 further comprising an oxygen storage component selected from the group consisting of cerium and praseodymium compounds.

22. The article as recited in claim 21 wherein the oxygen storage component is ceria.

23. The article as recited in claims 1, 6 or 16 wherein at least one of the first or second layers further comprises a nickel or iron component.

24. The article as recited in claim 23 wherein the first layer further comprises a nickel or iron component.

25. The article as recited in claims 1, 6 or 16 further comprising at least one first alkaline earth metal component and at least one first or second upstream or downstream alkaline earth metal component wherein the alkaline earth metal is selected from the group consisting of magnesium, barium, calcium and strontium.

26. The article as recited in claim 25 wherein at least one of said alkaline earth metal component wherein the alkaline earth metal is selected from the group consisting of strontium and barium.

27. The article as recited in claim 26 wherein at least one of said alkaline earth metal component is barium oxide.

28. The article as recited in claim 26 wherein at least one of said alkaline earth metal component is strontium oxide.

29. The article as recited in claims 1, 6 or 16 further comprising at least one of first or second, upstream or downstream rare earth metal component and second rare earth metal wherein the rare earth metal is selected from the group of from lanthanum and neodymium.

30. The article as recited in claim 29 wherein at least one of said rare earth metal components is derived from lanthanum.

31. The article as recited in claim 29 wherein at least one of said rare earth metal components is derived from neodymium.

32. The article as recited in claims 1, 6 or 16 wherein each of the upstream zone and downstream zone the composite is in the form of a pellet with the first layer on the inside and the second layer on the outside of the pellet.

33. The article as recited in claim 32 wherein at least one of the first and second layers further comprise a particulate composite of zirconia and rare earth oxide.

34. The article as recited in claim 33 wherein the rare earth oxide is ceria and, optionally, further comprises lanthana, neodymia and mixtures thereof.

35. The article as recited in claims 6 or 16 wherein there is:
from about 0.15 to about 1.0 g./in$^3$ of the first upstream support;
at least about 0.2 g/in$^3$ of an oxygen storage component in intimate contact with the first upstream platinum group metal component;
from about 0.025 to about 0.5 g/in$^3$ of at least one first alkaline earth metal components;
from about 0.025 to about 0.5 g/in$^3$ of a first upstream zirconium component;
from about 0.025 to about 0.5 g/in$^3$ of at least one first upstream rare earth metal component selected from the group consisting of lanthanum metal components and neodymium metal components;
from about 0.15 g/in$^3$ to about 1.0 g/in$^3$ of the second upstream support;
from about 0.025 g/in$^3$ to about 0.5 g/in$^3$ of at least one upstream second alkaline earth metal components;
from about 0.025 g/in$^3$ to about 0.5 g/in$^3$ of at least one upstream second rare earth metal component selected from the group consisting of lanthanum metal components and neodymium metal components; and
from about 0.025 to about 0.5 g/in$^3$ of the second upstream zirconium component.

36. The article as recited in claim 35 wherein at least one of the first and second upstream layers further comprises from about 0.025 g/in$^3$ to about 0.5 g/in$^3$ of a nickel component.

37. The article as recited in claim 35 wherein at least one of the first and second upstream layers further comprises from about 0.1 g/in$^3$ to about 1.0 g/in$^3$ of a particulate composite of zirconia and ceria and optionally further comprising lanthana, neodymia and mixtures thereof.

38. The article as recited in claim 37 wherein the particulate composite of zirconia and ceria comprises 60 to 90 wt. % zirconia, 10 to 30 wt. % ceria and from 0 to 10 wt % rare earth oxides comprising lanthana, neodymia and mixtures thereof.

39. The article as recited in claims 1, 6 or 16 wherein there is at least 10.0 g/ft$^3$ each of a first and second upstream palladium component.

40. The article as recited in claims 6 or 16 wherein there is:
from about 0.0175 to about 0.3 g/in$^3$ of first downstream palladium component;
from about 0 to about 0.065 g/in$^3$ of a first downstream platinum component;
from about 0.15 to about 2.0 g/in$^3$ of the first downstream support;
from about 0.025 to about 0.5 g/in$^3$ of at least one first alkaline earth metal components;
from about 0.025 to about 0.5 g/in$^3$ of the first downstream zirconium component;
from about 0.025 to about 0.5 g/in$^3$ of at least one first downstream rare earth metal component selected from the group consisting of ceria metal components, lanthanum metal components and neodymium metal components;
from about 0.001 g/in$^3$ to about 0.03 g/in$^3$ of a second downstream rhodium component;
from about 0.001 g/in$^3$ to about 0.15 g/in$^3$ of second downstream platinum;
from about 0.15 g/in$^3$ to about 1.5 g/in$^3$ of the second downstream support;
from about 0.1 to 2 g/in$^3$ of the second downstream oxygen storage composition;
from about 0.025 g/in$^3$ to about 0.5 g/in$^3$ of at least one second downstream rare earth metal component selected from the group consisting of lanthanum metal components and neodymium metal components; and
from about 0.025 to about 0.5 g/in$^3$ of the second downstream zirconium component.

41. The article as recited in claim 40 wherein at least one of the first and second downstream layers further comprises from about 0.025 g/in$^3$ to about 0.5 g/in$^3$ of a nickel component.

42. The article as recited in claim 40 wherein at least one of the first and second downstream layers further comprises from about 0.1 g/in$^3$ to about 1.0 g/in$^3$ of a particulate composite of zirconia and ceria and optionally further comprising lanthana, neodymia and mixtures thereof.

43. The article as recited in claim 42 wherein the particulate composite of zirconia and ceria comprises 60 to 90 wt. % zirconia, 10 to 30 wt. % ceria and from 0 to 10 wt % rare earth oxides comprising lanthana, neodymia, yttria and mixtures thereof.

44. The article as recited in claims 1, 6 or 16 wherein the upstream zone is supported on an upstream substrate and the downstream zone is supported on a downstream substrate.

45. The article as recited in claim 44 wherein the upstream and downstream substrates comprise honeycomb carriers.

46. The article as recited in claim 45, further comprising a catalytic converter support canister.

47. The article as recited in claim 46 wherein the canister containing the upstream and downstream zones is located in the underfloor position of a motor vehicle exhaust system.

48. The article as recited in claim 47 wherein the upstream honeycomb has an axial length of from about 0.5 to about 3.0 inches and the downstream honeycomb has an axial length of greater than the upstream catalyst.

49. The article as recited in claim 45 wherein the downstream honeycomb has a greater thermal mass than the upstream honeycomb.

50. The article as recited in claim 44 wherein the downstream substrate has a greater thermal mass than the upstream substrate.

51. The article as recited in claim 44 wherein the upstream zone comprises a metal honeycomb and the downstream zone comprises a ceramic monolith.

* * * * *